(12) United States Patent  
Mitobe et al.

(10) Patent No.: US 9,279,993 B2  
(45) Date of Patent: Mar. 8, 2016

(54) OPTICAL FILM, POLARIZING PLATE, PICTURE DISPLAY APPARATUS, AND 3D PICTURE DISPLAY SYSTEM

(71) Applicant: FUJIFILM Corporation, Tokyo (JP)

(72) Inventors: Humitake Mitobe, Kanagawa (JP); Shinichi Morishima, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 107 days.

(21) Appl. No.: 13/661,340

(22) Filed: Oct. 26, 2012

(65) Prior Publication Data

US 2013/0106675 A1  May 2, 2013

(30) Foreign Application Priority Data

Nov. 1, 2011  (JP) .................................. 2011-239955  
Oct. 12, 2012  (JP) .................................. 2012-227263

(51) Int. Cl.
| | |
|---|---|
| C09K 19/00 | (2006.01) |
| G02B 27/26 | (2006.01) |
| G02B 5/30 | (2006.01) |
| B32B 23/04 | (2006.01) |
| G02F 1/13363 | (2006.01) |

(52) U.S. Cl.  
CPC ............... *G02B 27/26* (2013.01); *B32B 23/04* (2013.01); *G02B 5/3016* (2013.01); *B32B 2307/412* (2013.01); *B32B 2457/20* (2013.01); *G02F 2001/133638* (2013.01); *G02F 2413/11* (2013.01); *Y10T 428/10* (2015.01); *Y10T 428/1036* (2015.01)

(58) Field of Classification Search  
CPC .......... G02F 1/13363; G02F 1/133632; G02F 1/133634; G02F 1/1337; G02F 1/133711; G02F 1/13378; G02F 1/133784; G02B 5/3016; G02B 5/3025; G02B 5/3033; G02B 5/3083; G02B 5/32; Y10T 428/10; Y10T 428/1036; Y10T 428/1041; Y10T 428/105

USPC ........... 428/1.1, 1.2, 1.3, 1.31, 1.33; 349/117, 349/118, 123, 126, 15; 359/485.03, 485.07  
See application file for complete search history.

(56) References Cited

U.S. PATENT DOCUMENTS

| | | | |
|---|---|---|---|
| 2008/0107828 A1* | 5/2008 | Ohtani et al. | 428/1.1 |
| 2008/0174724 A1* | 7/2008 | Nakayama et al. | 349/96 |
| 2011/0013121 A1* | 1/2011 | Kashima | 349/86 |
| 2012/0287358 A1* | 11/2012 | Mitobe et al. | 349/15 |

FOREIGN PATENT DOCUMENTS

| | | |
|---|---|---|
| JP | 04-166915 A | 6/1992 |
| JP | 2000-231109 A | 8/2000 |
| JP | 2009-282424 | 12/2009 |
| JP | 2010-107542 | 5/2010 |

OTHER PUBLICATIONS

Office Action issued by the Japanese Patent Office on May 26, 2015 in connection with Japanese Patent Application No. 2012-227263.

* cited by examiner

*Primary Examiner* — Ruiyun Zhang  
(74) *Attorney, Agent, or Firm* — Jean C. Edwards, Esq.; Edwards Neils PLLC

(57) ABSTRACT

An optical film includes a transparent film having a thickness of 10 to 150 μm and a first layer on a first surface of the transparent film. The first layer has an average in-plane refractive index that is highest of average refractive indices of the transparent film and a layer disposed on the first surface, and the average in-plane refractive index of the first layer is higher than average refractive indices of the transparent film and the layer other than the first layer disposed on the first surface by 0.02 or more, wherein the average in-plane refractive index of the first layer is higher than the average refractive index of the transparent film by 0.02 or more, provided that the layer disposed on the first surface is the first layer alone, and the first layer has an optical thickness D satisfying: 260×N−190−65 nm≤D≤260×N−190+65 nm (N is an integer of 6 to 12).

16 Claims, 3 Drawing Sheets

OPTICAL FILM, POLARIZING PLATE, PICTURE DISPLAY APPARATUS, AND 3D PICTURE DISPLAY SYSTEM

CROSS-REFERENCE TO RELATED APPLICATIONS

The present application claims the benefit of priority from Japanese Patent Application No. 239355/2011, filed on Nov. 1, 2011, and Japanese Patent Application No. 227263/2012 filed on Oct. 12, 2012, the contents of which are herein incorporated by reference in their entirety.

BACKGROUND OF THE INVENTION

1. Field of the Invention

The present invention relates to a technology of reducing minute interference unevenness in an optical film disposed on the viewing side surface of a three-dimensional (3D) picture display apparatus and also relates to a polarising plate, a picture display apparatus, and a 3D picture display system each employing the technology.

2. Description of the Related Art

Conventionally, 3D picture display apparatuses having $\lambda/4$ plates in viewing side front of display panels have been proposed. The $\lambda/4$ plate is, together with a polarising film, disposed on the viewing side surface of the display panel and is used for forming a circularly polarized picture. The $\lambda/4$ plate is required to regulate the in-plane slow axis in a specific direction with respect to the absorption axis of the polarizing film. A passive glass system needs a patterned $\lambda/4$ plate in which, in-plane slow axes being orthogonal to each other are alternately arranged. If the $\lambda/4$ plate can be produced with a liquid crystal composition, the control of the in-plane slow axis is advantageously easy. The in-plane slow axis of a phase difference layer formed of a liquid crystal compound is generally controlled with an alignment film.

An optical film having an alignment film and a phase difference layer formed of a liquid crystal compound on a transparent film as a support has been widely used mainly as an optically compensatory film of a liquid crystal display apparatus. The optically compensatory film is disposed between a liquid crystal cell and a polarizing film. Consequently, in the use as an optically compensatory film, even if interference occurs at the interface between the alignment film and the phase difference layer, it does not affect the display performance. Accordingly, in the optically compensatory film having such a configuration, the problem of interference at the interface between the alignment film and the phase difference layer has not been almost investigated. However, in the above-mentioned configuration, i.e., in a configuration where the optically compensatory film is disposed on the further outer side than the polarizing film on the viewing side of the display panel, it is concerned that the interference resulting from a refractive index difference at the interface between the alignment film and the phase difference layer affects the display performance.

A laminate of a plurality of optical thin films is generally known to cause interference unevenness. The interference unevenness can be reduced by uniformizing the thickness of each optical thin film to remove unevenness or reducing the refractive index difference at the interface. Unfortunately, it is technically difficult to completely remove the unevenness in thickness, and a reduction in difference of refractive index narrows the choice of usable materials and is therefore also difficult. Though the interference unevenness can be reduced by arranging a light-scattering layer on the surface or the inside, the arrangement of the light-scattering layer on the viewing side of a picture display apparatus deteriorates the clearness of a picture displaying surface and also causes a problem of a reduction in picture contrast.

In the liquid crystal cell of a liquid crystal display apparatus, a large number of optical thin films, such as a pixel electrode layer, an alignment film, a liquid crystal layer, and a color film layer, are laminated on the inner surface of a glass substrate, and it is known that interference unevenness is caused by the cell gap or the unevenness in thickness of the liquid, crystal layer. Methods for solving this problem have been also proposed (e.g., Japanese Patent Paid-Open No. Hei 4-166915 and Japanese Patent Laid-Open No. 2000-231109).

SUMMARY OF THE INVENTION

The present inventor has actually observed an optical film including a plurality of optical thin films disposed on the further outer side than the polarizing film on the outer side of a display panel and has found that small flicker that can be recognised by the human naked eye occurs during displaying a black display or at the time of switching off the power source. This was not conventionally known. This flicker is caused by the interference unevenness having a cycle of several nanometers occurring at the interface of the optical thin films of the optical film. This interference unevenness differs from the interference unevenness that is solved in Japanese Patent Laid-Open No. Hei 4-166915 and Japanese Patent Laid-Open No. 2000-231109.

The present invention has been made in view of the problem described above, and an object of the present invention is to reduce the minute interference unevenness in the optical film, comprising a plurality of optical thin films.

In particular, it is an object of the present invention to provide an optical film, which is disposed on the viewing side surface of a 3D picture display apparatus, reduced in occurrence of minute interference unevenness and to provide a polarising plate, a picture display apparatus, and a 3D picture display system each having the optical film.

The method, for solving the above-mentioned problem is as follows.

[1] An optical film comprising:
a transparent film having a thickness of 10 to 150 μm and
at least a first layer on one surface (first surface) of the transparent film,
wherein the first layer has an average in-plane refractive index that is highest, of average refractive indices of the transparent film and a layer disposed on the first surface of the transparent film, and the average in-plane refractive index of the first layer is higher than average refractive indices of the transparent film and the layer other than the first layer disposed on the first, surface of the transparent film by 0.02 or more, wherein the average in-plane refractive index of the first, layer is higher than the average refractive index of the transparent film by 0.02 or more, provided that the layer disposed on the first surface is the first layer alone, and
the first layer has an optical thickness D satisfying:

$$260 \times N{-}190{-}65 \text{ nm} \leq D \leq 260 \times N{-}190{+}65 \text{ nm} \ (N \text{ is an integer of 6 to 12}).$$

[2] The optical film according to [1], further comprising:
a functional layer on the other surface (second surface) of the transparent film.

[3] The optical film according to [2], wherein the functional layer is a high refractive index layer having an average in-plane refractive index higher than the average in-plane refractive index of the transparent film on the second surface of the transparent film.

[4] The optical film according to any one of [1] to [3], further comprising:
a high refractive index layer having an average in-plane refractive index higher than the average in-plane refractive index of the transparent film, and a low refractive index layer having an average in-plane refractive index lower than the refractive index of the transparent film on the second surface of the transparent film.

[5] The optical film according to any one of [1] to [4], wherein the first layer is a phase difference layer in which the alignment of a liquid crystal compound is fixed.

[6] The optical film according to any one of [1] to [5], further comprising:
a second layer between the first layer and the transparent film, wherein the transparent filmy the second layer, and the first layer have average refractive indices satisfying the following relationship:

transparent film≤second layer<first layer.

[7] The optical film according to [6], wherein the second layer is an alignment film or a pasting layer.

[8] The optical film according to any one of [1] to [7], wherein the in-plane retardation Re(550) at a wavelength of 550 nm is 80 to 200 nm, and the retardation Rth(550) in the thickness direction at a wavelength of 550 nm is −100 to 200 nm.

[9] The optical film according to any one of [1] to [8], wherein the first layer is a patterned phase difference layer having first and second phase difference regions, wherein the in-plane slow axis of the first phase difference region is different from the in-plane slow axis of the second, phase difference region and/or the in-plane retardation of the first phase difference region is different from the in-plane retardation of the second phase difference region.

[10] The optical film according to any one of [1] to [9], wherein the transparent film is a cellulose acylate film or a cyclic olefin polymer film.

[11] A polarizing plate comprising an optical film according to any one of [1] to [10] and a polarizing film.

[12] The polarizing plate according to [11], wherein
the first layer of the optical film is a phase difference layer having an in-plane slow axis that crosses the absorption axis of the polarizing film at an angle of 45°.

[13] A picture display apparatus comprising:
a display panel; and
a polarizing plate according to [11] or [12] on the viewing side surface of the display panel.

[14] A 3D picture display system comprising:
a picture display apparatus according to [13]; and
a polarizing film that transmits a picture displayed on the picture display apparatus to allow viewing the picture as a 3D picture.

According to the present, invention, the minute interference unevenness in an optical film comprising a plurality of optical thin films can be reduced.

In particular, the present invention can provide an optical film, which is disposed on the viewing side surface of a 3D picture display apparatus, reduced in occurrence of interference unevenness and can provide a polarizing plate, a picture display apparatus, and a 3D picture display system each having the optical film.

Figure 1:
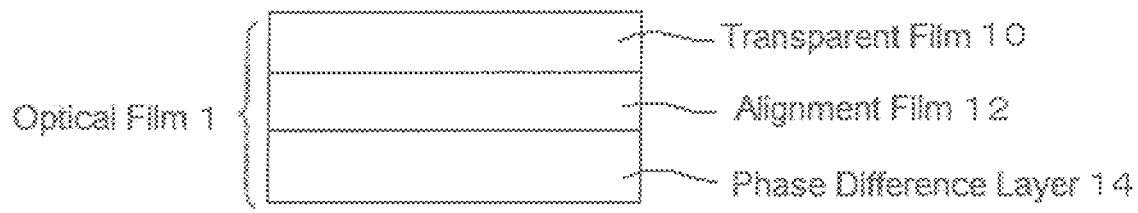
FIG. 1 is a schematic cross-sectional view of an example of the optical film of the present invention.

*1: Ln layer means low refractive index layer; *2: HC layer means hard coat layer; *3: CA means cellulose acetate; *4: average in-plane refractive index is shown; and *5: RLC means rod-like liquid crystal.

BEST MODE FOR CARRYING OUT THE INVENTION

The invention is described in detail hereinunder. In this description, the numerical range expressed, by the wording "a number to another number" means the range that falls between the former number indicating the lowermost limit of the range and the latter number indicating the uppermost limit thereof. First described, are the terms used in this description.

In this description, $Re(\lambda)$ and $Rth(\lambda)$ are retardation (nm) in plane and retardation (nm) along the thickness direction, respectively, at a wavelength of $\lambda$. $Re(\lambda)$ is measured by applying light having a wavelength of $\lambda$ nm to a film in the normal direction of the film, using KOBRA 21ADH or WR (by Oji Scientific Instruments). The selection of the measurement wavelength may be conducted according to the manual-exchange of the wavelsngth-selective-fliter or according to the exchange of the measurement value by the program. When a film to be analyzed is expressed by a monoaxial or biaxial index ellipsoid, $Rth(\lambda)$ of the film is calculated as follows.

$Rth(\lambda)$ is calculated by KOBRA 21ADH or WR on the basis of the six $Re(\lambda)$ values which are measured for incoming light of a wavelength $\lambda$ nm in six directions which, are decided by a 10° step rotation from 0° to 50° with respect to the normal direction of a sample film using an in-plane slow axis, which is decided by KOBRA 21ADH, as an inclination axis (a rotation axis; defined in an arbitrary in-plane direction if the film has no slow axis in plane), a value of hypothetical mean refractive index, and a value entered as a thickness value of the film. In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the $Rth(\lambda)$ of the film is calculated by KOBRA 21ADH or WR. Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (A) and (B):

$$Re(\theta) = \left[ nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}} \right] \times \frac{d}{\cos\left(\sin^{-1}\left(\frac{\sin(-\theta)}{nx}\right)\right)} \quad (A)$$

Re(θ) represents a retardation value in the direction inclined by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the film.

$$Rth = \{(nx \times ny)/2 - nz\} \times d \quad (B)$$

When the film to be analyzed is not expressed by a monoaxial or biaxial index ellipsoid; or that is, when the film does not have an optical axis, then Rth(λ) of the film may be calculated as follows:

Re(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with, a light having a wavelength of λnm applied in the inclined direction; and based on the thus-measured retardation values, the estimated value of the mean refractive index and the inputted film, thickness value, Rth(λ) of the film may be calculated by KOBRA 21ADH or WR. In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main optical films are listed below: cellulose acylate (1.48), cycloolefin polymer (1.52), polycarbonate (1.59), polymethylmethacrylate (1.49) and polystyrene (1.59). KOBRA 21ADH or KR calculates nx, ny and nz, upon enter of the hypothetical values of these mean refractive indices and the film thickness. On the basis of thus-calculated nx, ny and nz, Nz=(nx−nz)/(nx−ny) is further calculated.

In this description, "visible light" means from 380 nm to 780 nm. Unless otherwise specifically defined in point of the wavelength in measurement in this description, the wavelength in measurement is 550 nm.

In this description, the angle (for example, "90°", etc.) and the relational expressions thereto (for example, "perpendicular", "parallel", "crossing at 45°", etc.) should be so interpreted as to include the error range generally acceptable in the technical field to which the invention belongs. For example, this means within a range of a strict angle ±less than 10°, and the error from the string angle is preferably at most 5°, more preferably at most 3°.

The present invention relates to an optical film comprising a transparent film having a thickness of 10 to 150 μm and at least a first layer on one surface (first surface) of the transparent film, wherein the first layer has an average in-plane refractive index that is highest of the average refractive indices of the transparent film and at least one layer including the first layer disposed on the first surface of the transparent film, the average in-plane refractive index of the first layer is higher than the average refractive indices of the transparent film and at least one layer other than the first layer disposed on the first surface of the transparent film by 0.02 or more. In the case where the layer disposed on the first surface is the first layer alone, the average in-plane refractive index of the first layer is higher than the average in-plane refractive index of the transparent film by 0.02 or more.

In an optical film, having a configuration where layers having different refractive indices are laminated, interference occurs at the interface of the layers. When the optical film is disposed on the further outer side than the polarising film on the viewing side surface of a picture display apparatus, a viewer recognizes interference unevenness having a cycle of several nanometers as small flickers during displaying a black display or at the time of switching off the power source. The present invention reduces the interference unevenness having a cycle of several nanometers by regulating the optical thickness D of the first layer within the range of 260×N−190−65 (nm)≤D≤260×N−190+65 (nm) (N is an integer of 6 to 12).

Conventionally, an optically compensatory film comprising an alignment film and a phase difference layer formed of a liquid crystal compound on a transparent film is widely used in a liquid crystal display apparatus. In the optically compensatory film having such a configuration, though interaction occurs at the interface between, the alignment film and the phase difference layer, since the optically compensatory film is disposed between the liquid crystal cell and the polarizing film, no flicker is caused by the above-mentioned interference unevenness. The present inventor, however, has first found that the disposition of an optical film having the above-mentioned configuration on the further outer side than the polarising film on the viewing side causes small flicker and that the flicker is caused by interference unevenness having a cycle of several nanometers at the interface of the layers in the optical film.

Figure 8:
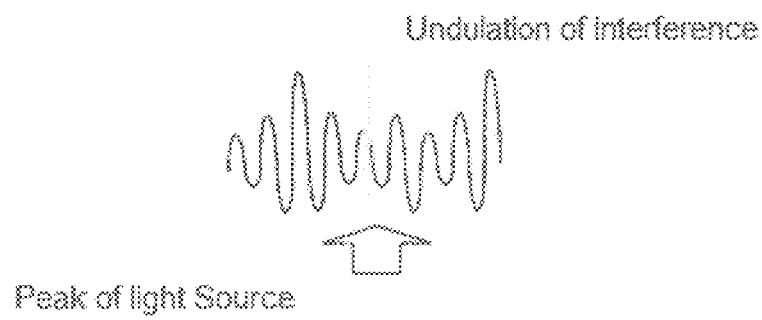
FIG. 8 is a schematic view for explaining the effect of the present invention.

The present inventor has variously studied and has found that in the optical film of the above-mentioned configuration, one intensity of reflectance varies with a cycle of several nanometers, in particular, when the transparent film, used as a support has a thickness of 10 to 150 μm and the first layer disposed on one surface (first surface) of the transparent film has an average in-plane refractive index higher than the average in-plane refractive index of the transparent film, by 0.02 or more. It was also found by further studies that, as schematically shown in FIG. 8, the phenomenon is caused by the undulation of interference due to overlapping of a plurality of interference waves and that the undulation is recognized as flicker on the screen. Further investigation revealed that the flicker becomes notably, in particular, under a light source having a plurality of bright lines, such as three wavelength light sources used as lighting systems, for example. The inventor has further studied based on this finding and has found that the degree of undulation of interference can be reduced by allowing the weak position of the undulation of interference to coincide with the bright line of a light, source through regulation of the optical thickness D of the first layer to a predetermined range and that, as a result, flicker recognized by the human naked, eye can be prevented from occurring. Thus, the present invention has been accomplished.

Specifically, in the present invention, the optical thickness D of the first layer is regulated within the range of 260×N−190±65 nm (K is an integer of 6 to 12). In a first layer having an optical thickness D of 260×N190 nm, the weak position of the undulation of interference approximately coincides with the bright line of a light source, and a variation in optical thickness within a range of ±65 nm does not cause unevenness that is recognised by the human naked eye. A smaller variation is preferred, and the variation is preferably within a range of ±50 nm, more preferably within a range of ±25 nm.

The first layer having an optical thickness D within a range of 260×N−190±65 nm (N is an integer of 6 to 12) satisfies:

260×$N$−190−65 (nm)≤$D$≤260×$N$−190+65 (nm), i.e.,

260×$N$−255 (nm)≤$D$≤260×$N$−125 (nm).

The optical thickness satisfies the relational expression with N being an integer of 6 to 12. That is, the optical thickness D of the first layer is within the range shown in Table 1. Table 1 collectively shows the ranges of the optical thickness when the variation is within ±50 nm or ±25 nm. The optical thickness means a product of the film thickness and the refractive index.

TABLE 1

| N | The range of the optical thickness D of the first layer (the variation is within ±65 nm) | | The range of the optical thickness D of the first layer (the variation is within ±50 nm) | | The range of the optical thickness D of the first layer (the variation is within ±25 nm) | |
|---|---|---|---|---|---|---|
| | Lower Limit (nm) | Upper Limit (nm) | Lower Limit (nm) | Upper Limit (nm) | Lower Limit (nm) | Upper Limit (nm) |
| 6 | 1305 | 1435 | 1320 | 1420 | 1345 | 1395 |
| 7 | 1565 | 1695 | 1580 | 1680 | 1605 | 1655 |
| 8 | 1825 | 1955 | 1840 | 1940 | 1865 | 1915 |
| 9 | 2085 | 2215 | 2100 | 2200 | 2125 | 2175 |
| 10 | 2345 | 2475 | 2360 | 2460 | 2385 | 2435 |
| 11 | 2605 | 2735 | 2620 | 2720 | 2645 | 2695 |
| 12 | 2865 | 2995 | 2880 | 2980 | 2905 | 2955 |

In particular, from the viewpoints of stability and cost of manufacturing, N is preferably an integer of 7 to 12, more preferably 8 to 12, and most preferably 9 to 12.

In the optical film of the present invention, the first layer has the highest average in-plane refractive index of the average refractive indices of the transparent film and all of the layer(s) disposed on the first surface of the transparent film, and the average in-plane refractive index of the first layer is higher than the average refractive indices of the transparent film and the layers other than the first layer disposed on the first surface of the transparent film by 0.02 or more. The first layer is not particularly limited as long as these relationships are satisfied. The average in-plane refractive index difference between the first layer and the other layers and the average in-plane refractive index difference between the first layer and the transparent film are each preferably 0.03 or more. In an embodiment where a second layer (e.g., various functional layers such as an alignment film or a pasting layer) is disposed between the transparent film and the first layer, the average in-plane refractive index of the second layer may be an intermediate value between the average in-plane refractive indices of the first layer and the transparent film. The average in-plane refractive index of the second layer is preferably equal to or higher than the average in-plane refractive index of the transparent film. For example, the average in-plane refractive index of the second layer may be higher than the average in-plane refractive index of the transparent film by 0.02 or more or 0.03 or more.

The refractive index can be directly measured with an Abbe's refractometer or can be determined from the spectral reflectance spectrum or the spectroscopic ellipsometry.

The average in-plane refractive index in the plane of the first layer is not particularly limited as long as the above-mentioned relationship is satisfied. Though it varies depending on the type of the liquid crystal compound, in general, a phase difference layer formed by fixing the alignment of a disk-like or rod-like liquid crystal compound has an average in-plane refractive index of about 1.5 to 1.65. Accordingly, in a configuration where the first layer is a phase difference layer made of a liquid crystal composition, the thickness of the first layer is preferably 0.5 to 4 µm, more preferably 0.9 to 1.9 µm, for regulating the optical thickness D in the above-mentioned range when N is an integer of 6 to 12, bat the thickness is not limited to this range.

The average in-plane refractive index of, for example, a polymer film, which is usually used as the transparent film, is generally about 1.47 to 1.6.

As described above, the thickness of the transparent film is preferably 10 to 150 µm, more preferably 10 to 85 µm. The effect of the present invention is prominent when the thickness is within this range.

In a configuration where the second layer disposed between the transparent film and the first layer is an alignment film, though it varies depending on the type of the polymer as a main-component, the average in-plane refractive index is generally about 1.48 to 1.6. In a configuration where the second layer is a pasting layer, though it varies depending on the type of the adhesive agent composition or the bonding agent composition contained, the average in-plane refractive index is generally 1.45 to 1.53. The second layer may have any thickness. For example, the thickness of the second, layer when it is an alignment film is generally about 30 to 1400 nm and when it is a pasting layer is generally 0.1 to 50 µm, but is not limited to these ranges.

The first layer and the optional second layer are disposed on one surface (first surfaces of the transparent film. When the optical film of the present invention is disposed on the viewing side surface of, for example, a display panel, the first layer and the optional second layer are preferably disposed between the transparent film and the display panel. The layers disposed on the other surface (hereinafter, may also referred to as "second surface"; of the transparent film are not particularly limited from every viewpoint such as the average in-plane refractive index. One or more functional layers may be disposed on the second surface depending on the use of the optical film.

FIG. 1 is a schematic cross-sectional view of an example of the optical film, of the present invention. The relative relationship of each layer shown, in the drawing does not reflect the actual relative relationship. The same applies to other drawings.

The optical film 1 shown in FIG. 1 comprises an alignment film 12 and a phase difference layer 14 containing a liquid crystal compound fixed in an alignment state on one surface of a transparent film 10. In the example shown in FIG. 1, the phase difference layer 14 is the first layer, and the alignment film 12 is the second layer.

Figure 2:
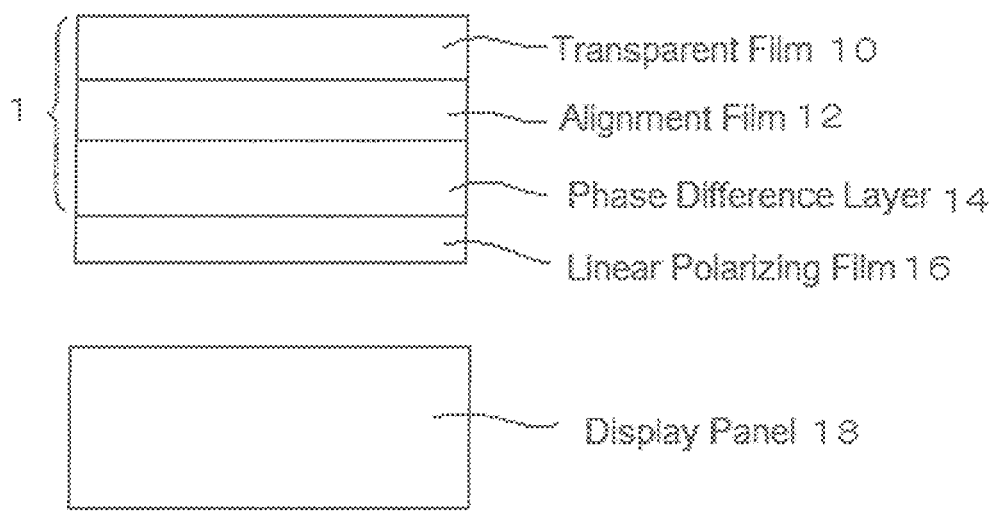
FIG. 2 is a schematic cross-sectional view of an example of the picture display apparatus of the present invention.

As shown in FIG. 2, the optical film 1 and a linear polarizing film 16 are disposed on the viewing side surface of a display panel 18. As shown in FIG. 2, the surface of the phase difference layer 14 may foe pasted to a surface of the polarizing film 16. In the case of a display panel 18 being a liquid crystal panel, comprising a polarizing film on the viewing side surface, the polarizing film 16 may be omitted. Alternatively, in the case of a display panel 18 being a liquid crystal panel comprising a polarizing film on the viewing side surface and also the polarising film 16 is disposed together with the optical film, the display panel and the optical film are arranged such that the absorption axis of the polarizing film on the viewing side surface of the display panel and the absorption axis of the polarizing film 16 of the optical film are parallel to each other.

The optical film 1 functions as a λ/4 plate mainly by the optical characteristics of the phase difference layer 14 and optionally by a combination with the optical characteristics of the transparent film 10. The optical film 1 is disposed such that the in-plane slow axis of the optical film 1 defines an angle of 45° with respect to the absorption axis of the polarizing film 16 and functions as a circular polarising plate in combination with the polarizing film 16. The display panel 18 displays a picture by controlling the transmittance of light from a light, source (not shown) disposed in back thereof. The picture is converted into a circularly polarised picture by the polarizing film 16 and the optical film 1 disposed on the viewing side surface of the display panel 18. The circularly polarized picture is observed by a viewer through active or passive circular polarized glasses and is recognized as a 3D picture.

The structural members of the optical film 1, i.e., the transparent film 10, the alignment film 12, and the phase difference layer 14 have average in-plane refractive indices satisfying the following relationship:

transparent film≤10 alignment film 12<phase difference layer 14.

Consequently, interference occurs at the interface between the phase difference layer 14 and the alignment film 12, and a combination of a plurality of interference waves causes undulation of the interference with a cycle of several nanometers. This is recognised as a viewer as small flicker during displaying a black display or at the time of switching off the power source. In the optical film 1, since the phase difference layer 14 has an optical thickness D in the range of 260×N−190±65 nm (N is an integer of 6 to 12), the weak position of the undulation of interference approximately coincides with the bright line of a three wavelength light source. As a result, the undulation of interference is reduced to prevent the occurrence of small flicker.

Figure 3:
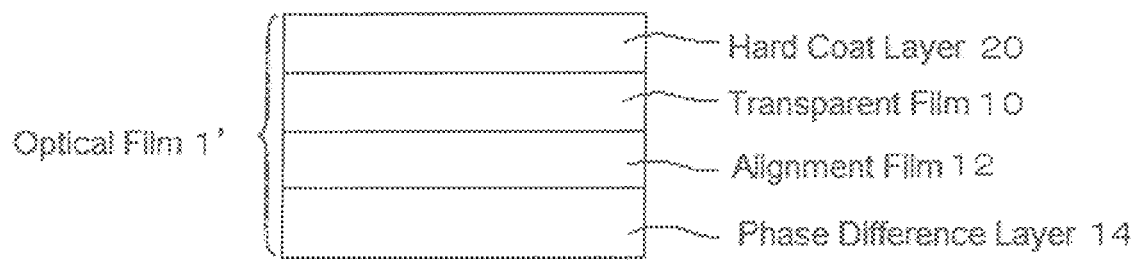
FIG. 3 is a schematic cross-sectional view of another example of the optical film of the present invention.
Figure 4:
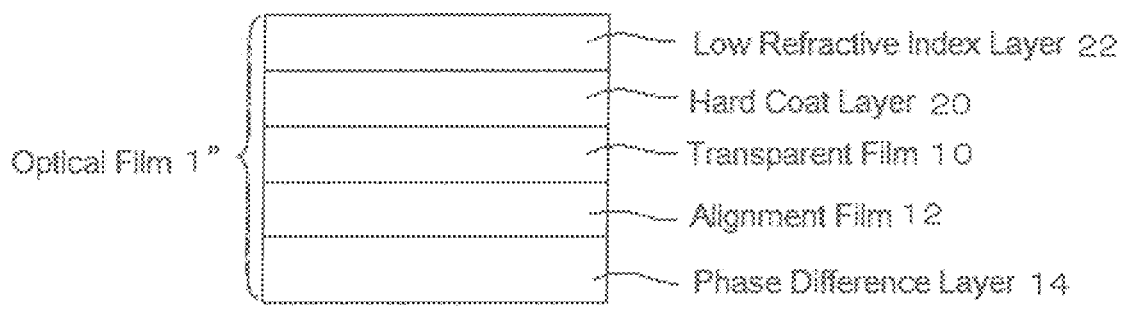
FIG. 4 is a schematic cross-sectional view of another example of the optical film of the present invention.

FIGS. 3 and 4 snow schematic cross-sectional views of other examples of the optical film of the present invention. The same members as those shown in FIG. 1 are designated by the same reference characters, and detailed descriptions thereof are omitted.

The optical film 1' shown in FIG. 3 is an example where a hard, coat layer 20 is disposed on the back surface (i.e., the surface on the side where the alignment film 12 and the phase difference layer 14 are not disposed) of the transparent film 10. The optical film 1' shown in FIG. 4 is an example where a low refractive index layer 22 is disposed on the further outer side surface than the hard coat layer 20. When the optical film 1' or 1" and a polarizing film are disposed on the viewing side surface of a display panel, as shown in FIG. 2, the phase difference layer 14 and a polarising film are laminated by pasting the surfaces thereof.

The optical films 1' and 1" each have the hard coat layer 20 and have therefore improved resistance against physical, shock from the outside. The optical film 1" further has the low refractive index layer 22 and therefore can reduce reflection of outer light to contribute to further improvement in picture-displaying performance. In an optical design for providing an antireflective surface film, the hard coat layer 20 and the transparent film 10 in each of the optical films 1' and 1" preferably have average in-plane refractive indices satisfying the following relationship;

hard coat layer 20>transparent film 10.

The transparent film 10 and the low refractive index layer 22 in the optical film 1" preferably have average in-plane refractive indices satisfying the following relationship:

transparent film 10>low refractive index layer 22; and the hard coat layer 20 and the low refractive index layer 22 preferably have average in-plane refractive indices satisfying the following relationship:

hard coat layer 20>low refractive index layer 22.

In preferred examples of the optical films 1' and 1", the transparent film 10 has a thickness of 10 to 150 μm; the phase difference layer 14 has a thickness of 0.5 to 4 μm; the hard coat layer and the low refractive index layer each have a thickness of 0.4 to 35 μm; she transparent film 10, the alignment film 12, and the phase difference layer 14 have average in-plane refractive indices satisfying the following relationship;

transparent film 10≤alignment film 12<phase difference layer 14;

the average in-plane refractive-index difference between the phase difference layer 14 and the alignment film 12 and the average in-plane refractive-index difference between the phase difference layer 14 and the transparent film 10 are each 0.02 or more; and the phase difference layer 14 has an optical thickness D within the range of 260×N−190±65 nm (N is an integer of 6 to 12), more preferably 260×N-190±50 nm, and most preferably 260×N−190±25 nm. In this example, the average in-plane refractive indices preferably satisfy the following relationship:

hard coat layer 20>transparent film 10.

In the optical film 1", the average in-plane refractive indices further satisfy the following relationship;

transparent film 10>low refractive index layer 22.

Figure 5:
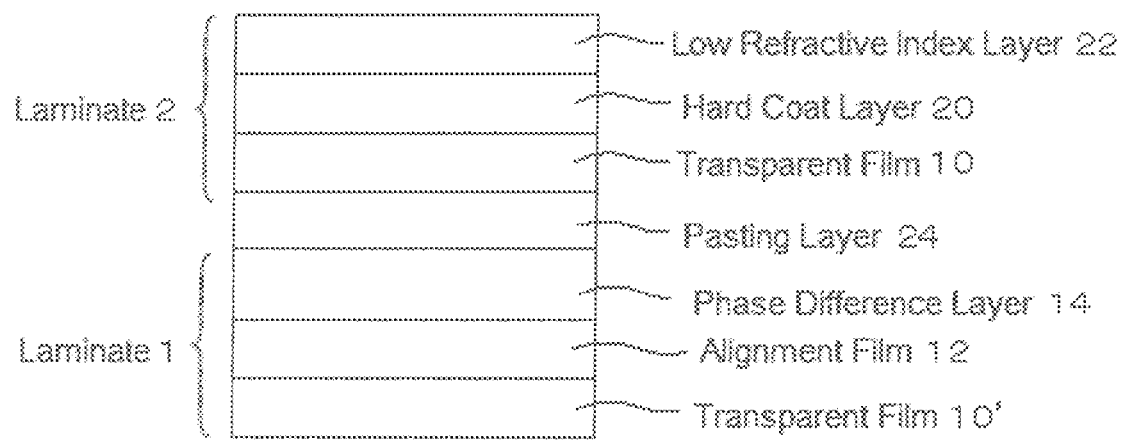
FIG. 5 is a schematic cross-sectional view of another example of the optical film of the present invention.

As shown FIGS. 3 and 4, the configuration having a functional layer such as a hard coat layer on the other surface (second surface) of the transparent film can be produced by forming a laminate comprising an optional alignment film and a phase difference layer on a surface of a transparent film, forming a laminate comprising a functional layer such as a hard coat layer on a surface of another transparent film, and pasting these laminates to each other, FIG. 5 is a schematic cross-sectional, view of an example of the optical film produced by this process. The optical film shown in FIG. 5 is produced by preparing a laminate 1 composed of an alignment film 12 and a phase difference layer 14 formed on a surface of a transparent film 10', preparing a laminate 2 composed of a hard coat layer 20 and a low refractive index layer 22 formed on a surface of a transparent film 10, and pasting the surface of the phase difference layer 14 of the laminate 1 and the back surface of the transparent film 10 of the laminate 2 with a pasting layer 24 of, for example, a an adhesive agent or a bonding agent. In the configuration shown in FIG. 5, the transparent film 10 used as a support for the hard coat, layer 20 and other layers in the laminate 2 is the transparent film, in the present invention; the phase difference layer 14 in the laminate 1 is the first layer in the present invention; and the pasting layer 24 is the second layer disposed between the transparent film and the first layer in the present invention.

More specifically, the average in-plane refractive index of the phase difference layer 14 is the highest among average refractive indices of the transparent film 10 and the layers disposed on one surface (first surface) of transparent film 10 and is higher by 0.02 or more than the average in-plane refractive index of the transparent film 10 and is higher by 0.02 or more than that of every layer disposed on the first surface of the transparent film 10, i.e., the average refractive indices of the pasting layer 24, the alignment film 12, and the transparent film 10'. The phase difference layer 14 has an optical thickness D in the range of 260×N−190±65 nm (N is an integer of 6 to 12), more preferably 260×N−190±50 nm, and most preferably 260×N−190±25 nm. Even if the phase difference layer 14 is disposed on the viewing side of a display panel, the undulation of interference is reduced to prevent occurrence of small flicker.

In a preferred example of the optical film having the configuration, shown in FIG. 5, the transparent film 10 has a thickness of 10 to 150 μm; the phase difference layer 14 has a thickness of 0.5 to 4 μm; the hard coat layer and the low refractive index layer each have a thickness of 0.4 to 35 μm; the average in-plane refractive indices satisfy the following relationship;

transparent film 10≤alignment film 12/pasting layer 24<phase difference layer 14;

the average in-plane refractive-index difference between the phase difference layer 14 and the pasting layer 24, the average in-plane refractive-index difference between the phase difference layer 14 and the alignment film 12, and the average in-plane refractive-index difference between the phase difference layer 14 and the transparent film 10 are each 0.02 or more; and the optical thickness D of the phase difference layer 14 is within the range of 260×N−190±65 nm (N is an integer of 6 to 12), more preferably 260×N−1.90±50 nm, and most preferably 260×N−190±25 nm. In this example, the average in-plane refractive indices preferably satisfy the following relationships:

hard coat layer 20>transparent film 10, and transparent film 10>low refractive index layer 22.

In configurations shown in FIGS. 1 to 5, the phase difference layer 14 alone or in combination with, for example, the transparent film 10 preferably shows the optical characteristics as a λ/4 layer. In a configuration used in an active circular polarized glass system, the phase difference layer 14 is a uniform phase difference layer and is disposed as shown in FIGS. 6A and 6B such that the in-plane slow axis a of the phase difference layer 14 is orthogonal to the absorption axis p of the polarizing film 16. When the horizontal direction in FIGS. 6A and 6B is assumed as the horizontal direction of the display surface, as shown in FIG. 6A, the in-plane slow axis a of the phase difference layer 14 is in the direction of 45° (or 135°) in the display, and the absorption axis p of the polarizing film 16 may be in the horizontal direction or the vertical direction in the display. Alternatively, as shown in FIG. 6B, the in-plane slow axis a of the phase difference layer 14 is in the horizontal direction (or the vertical direction) in the display, and the absorption axis p of the polarizing film 16 may be in the direction of 45° or 135° in the display.

Figure 7:
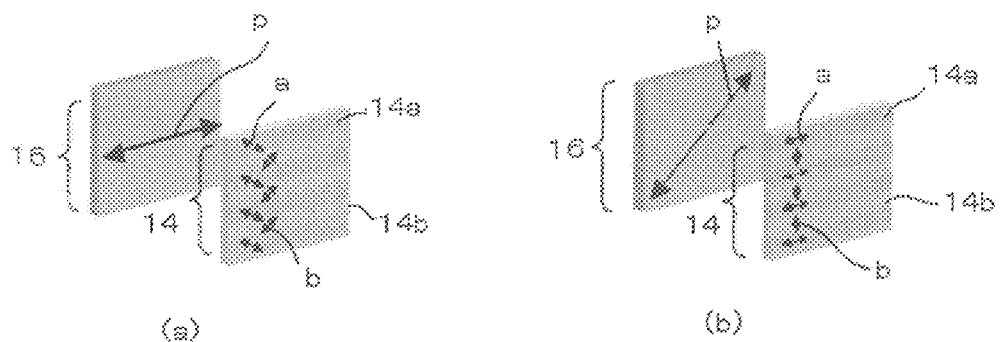
FIGS. 7A and 7B are views schematically illustrating a relationship between the axes of an optical film and a polarising film in another example of the polarizing plate of the present invention.

In a configuration used, in a passive circular polarized glass system, the phase difference layer 14 is preferably a patterned λ/4 layer. In an example, as shown in FIGS. 7A and 7B, the phase difference layer 14 is a patterned λ/4 layer having a stripe pattern of first, and second phase difference regions 14a and 14b alternately disposed, where the in-plane slow axis directions of the first and second phase difference regions 14a and 14b are orthogonal to each other and the in-plane retardations are each λ/4. The directions of in-plane slow axes a and b of the phase difference regions 14a and 14b may be, as shown in FIG. 7A, in the direction of ±45° with respect to the horizontal direction of the display or may be, as shown in FIG. 7B, in the directions 0° and 90°, respectively, with respect to the horizontal direction of the display. As in the active circular polarised glass system, as shown in FIGS. 7A and 7B, the phase difference layer 14 is disposed such that the in-plane slow axes a and b are orthogonal to the absorption axis p of the polarizing film 16.

The present invention also relates to a polarizing plate having the optical film of the present invention and a polarizing film. As shown in FIG. 2, the polarising plate is disposed on the viewing side surface of a display panel such that the polarising film is present on the display panel side. The polarizing plate may be any of a circular polarizing plate, an elliptical polarizing plate, and a linear polarising plate. In a configuration to be used in a 3D picture display apparatus, the circular polarizing plate is preferred, and the optical film of the present invention is preferably a λ/4 plate.

The present invention also relates to a picture display apparatus comprising at least an optical film of the present invention and a display panel. In a configuration where the optical film of the present invention is a phase difference plate, as shown in FIG. 2, the optical film is disposed, together with a linear polarising film, on the viewing side surface of a display panel and converts the picture displayed by the display panel into a circularly or elliptically polarized picture. A viewer views the circularly or elliptically polarized picture through a polarizing plate such as active polarised glasses (e.g., circular polarized glasses) to recognize as a stereo picture. In a configuration where the optical film of the present invention is a patterned phase difference plate, as shown in FIG. 2, the optical film is disposed, together with a linear polarizing film, on the viewing side surface of a display panel and converts the picture displayed by the display panel into circularly or elliptically polarized pictures that are polarized oppositely for the left eye and the right eye. A viewer views these circularly or eiliptically polarized pictures through a polarizing plate such as passive polarised glasses (e.g., circular polarized glasses) to recognise as a stereo picture.

In the present invention, any display panel can be used. For example, the display panel may be a liquid crystal panel having a liquid crystal layer, an organic EL display panel having an organic EL layer, or a plasma display panel. In every configuration, various possible structures can be employed. Since the liquid crystal panel and other display panels each have a polarising film for displaying a picture on the viewing side surface, the optical film of the present invention may be laminated alone on a surface of the polarizing film disposed on the viewing side surface of the liquid crystal panel.

An example of the display panel is a liquid crystal panel of a transparent mode and comprises a pair of polarizing films and a liquid crystal cell disposed therebetween. In general, a phase difference film for compensating the viewing angle is disposed between each polarizing film and the liquid crystal cell. The liquid crystal cell may have any structure, and a liquid crystal cell having an ordinary structure can be employed. For example, the liquid crystal cell comprises a pair of substrates facing each other and a liquid crystal layer disposed between the substrates and optionally comprises, for example, a color filter layer. The drive mode of the liquid crystal cell is not particularly limited, and various modes such as twisted nematic (TN), super twisted nematic (STN), vertical alignment (VA), in-plane switching (IPS), or optically compensated bend cell (QCB) can be used.

The present invention also relates to a stereo picture display system comprising at least a stereo picture display apparatus of the present invention and a polarizing plate disposed on the viewing side of the stereo picture display apparatus and allowing viewing a stereo picture through the polarizing plate. An example of the polarizing plate disposed on the outer side of the viewing side of the stereo picture display apparatus is polarised glasses to be worn by a viewer. The viewer observes pictures polarized oppositely for the left eye and the right eye displayed by the stereo picture display apparatus through circularly or linearly polarized glasses to recognize a stereo picture. The polarized glasses may be an active system or a passive system.

Various members used for producing the optical film of the present invention will now be described in detail.

The optical film of the present invention comprises at least a first layer on one surface of a transparent film. The first layer has an average in-plane refractive index that is higher by 0.02 or more than the average in-plane refractive index of the transparent film and is higher by 0.02 or more than that of every other layer disposed on a first surface of the transparent film. A second layer may be disposed between the transparent film and the first layer, and in such a configuration, the transparent film, the second layer, and the first layer preferably have average refractive indices satisfying the following relationship:

transparent film≤second layer<first layer.

In this configuration, in general, the first layer has a thickness of about 0.5 to 4 μm. In a configuration where the second layer is an alignment film, the second layer has a thickness of 0.05 to 1.4 μm. In a configuration where the second, layer is a pasting layer, the second layer has a thickness of about 0.1 to 50 μm. Since application of an organic material can stably form a layer having a thickness mentioned above, the first and the second layers are preferably formed by application and each contain an organic material. In the case where the layer disposed on the first surface is the first layer alone, the average in-plane refractive index of the first layer is higher than the average in-plane refractive index of the transparent film by 0.02 or more.

In one configuration of the optical film of the present invention, the optical film comprises a phase difference layer containing a liquid crystal compound fixed in an alignment state as the first layer on one surface of a transparent film and an alignment film or a pasting layer as the second layer between the transparent film and the first layer. The optical film in this configuration shows optical characteristics based on the optical characteristics of the phase difference layer or a combination of the optical characteristics of the phase difference layer and other members such, as the transparent film. Though the preferred optical characteristics vary depending on the use, the Re(550) is preferably 80 to 200 nm, and the Rth(550) is preferably −100 to 200 nm, in order to that the optical film disposed on the viewing side surface of a display panel functions as a circular polarizing plate or an elliptical polarizing plate, together with a polarizing film. In particular, in order to function as a circular polarizing plate, the optical film of the present invention, is preferably a λ/4 plate, and in this configuration, the Re(550) is preferably 115 to 160 nm, and the Rth(550) is preferably −50 no 100 nm.

<Transparent Film>

When the transparent film of the optical film of the present invention has a thickness of 10 to 150 μm, the effects of the present invention are notably high. The thickness is more preferably 10 to 85 μm. The optical characteristics of the transparent film are not particularly limited, and films having various optical characteristics can be used depending on the use. In addition, a polymer film having a low retardation may be used. Specifically, a film having an absolute value of Re of 50 nm or less may be used. The transparent film may be a phase difference film.

The material for forming the transparent film usable in the invention includes, for example, polycarbonate polymers; polyester polymers such as polyethylene terephthalate, polyethylene naphthalate, etc.; acrylic polymers such as polymethyl methacrylate, etc.; styrenic polymers such as polystyrene, acrylonitrile/styrene copolymer (AS resin), etc. As other examples of the material usable herein, also mentioned are polyolefins such as polyethylene, polypropylene, etc.; polyolefinic polymers such as ethylene/propylene copolymer, etc.; vinyl chloride polymers; amide polymers such as nylon, aromatic polyamides, etc.; imide polymers; sulfone polymers; polyether sulfone polymers; polyether ether ketone polymers; polyphenylene sulfide polymers; vinylidene chloride polymers; vinyl alcohol polymers; vinylbutyral polymers; arylate polymers, polyoxymethylene polymers; epoxy polymers; mixed polymers prepared by mixing the above-mentioned polymers. The polymer film in the invention may be formed as a cured layer of a UV-curable or thermocurable resin such, as acrylic, urethane, acrylurethane, epoxy, silicone or the like resins.

As the material for forming the transparent film, also preferred is use of thermoplastic norbornene resins. As the thermoplastic norbornene resins, there are mentioned Nippon Zeon's Zeonex and Zeonoa; JSR's Arton, etc.

As the material for forming the transparent film, also preferred is use cellulose polymer (hereinafter this may be referred to as cellulose acylate) such, as typically triacetylcellulose, which has heretofore been used as a transparent protective film for polarizer.

The transparent film may be produced by any method and may be produced by solution film formation or melt film formation. Furthermore, the transparent film may be a stretched film received stretching treatment for adjusting the retardation.

The polymer film mentioned above generally has an average in-plane refractive index of about 1.47 to 1.6.

<First Layer>

In one configuration of the optical film of the present invention, the optical film comprises a phase difference layer containing a liquid crystal compound as the first layer. The liquid crystal compound is preferably fixed in an alignment state. An example is a phase difference layer formed by fixing the alignment of a polymerizable composition containing a polymerizable liquid crystal compound by polymerization. The phase difference layer shows the phase difference resulting from the alignment of the liquid crystal compound.

The liquid, crystal compound used is not particularly limited. Liquid crystal compounds are classified into rod-like liquid crystal compounds and disk-like liquid crystal compounds depending on the shapes of the molecules. In the present invention, both liquid crystal compounds can be used. For example, a phase difference layer having an Re within a desired range, such as a λ/4 layer, can be formed by aligning a rod-like liquid crystal compound such that the major axis is parallel to the layer plane and fixing the state or aligning a disk-like liquid crystal compound such that the disk plane is perpendicular to the layer plane and fixing the state.

The in-plane slow axis of the phase difference layer formed by a liquid crystal compound can be controlled through the direction of the alignment treatment applied to the alignment film, formed as the first layer. An example is rubbing treatment, applied to the surface of an alignment film. In general, molecules of a liquid crystal compound are aligned such that the major axis is parallel, or orthogonal to the direction of the rubbing treatment. Another example is light irradiation treatment of a photo-alignment film. The slow axis may be controlled in a desired direction by controlling the alignment of a liquid crystal compound using a photo-alignment film that exhibits alignment ability in response to the polarising direction of the irradiation light or in response to one direction of the light irradiation. The alignment of a liquid crystal compound may be controlled by an alignment regulator that is used as an additive together with the liquid crystal compound. These can be achieved by appropriately using technologies conventionally employed in production of optically compensatory films or liquid crystal layers of liquid crystal cells.

The first layer may be a patterned phase difference layer. In such a configuration, for example, the alignment film disposed as the second layer is also preferably a patterned alignment film treated by mask rubbing or mask exposure. The patterned phase difference layer may be formed using a technology such as pattern printing.

The layer formed by fixing the alignment of a liquid crystal compound has an average in-plane refractive index of about 1.5 to 1.65 and has an average in-plane refractive index satisfying the above-mentioned relationship with the transparent film and the alignment film formed as the second layer in many cases.

When the first layer has a thickness of 0.5 to 4 µm, the effects of the present invention are notably high. The thickness is more preferably 0.9 to 1.8 µm. A layer having a thickness in this range can be stably formed by application of a liquid crystal compound.

<Second Layer>

In one configuration of the optical film, of the present invention, the second layer disposed between the transparent film, and the first layer is an alignment film. The alignment film may be made of any material and preferably contains an organic material such as a polymer as the main material. Examples of the material of the alignment film include modified and unmodified polyvinyl alcohols, acrylic acid copolymers, and methacrylic acid copolymers. Layers containing these materials as the main components are preferably formed so as to have an average in-plane refractive index of about 1.48 to 1.62 and a thickness of about 0.05 to 1.4 µm. A layer having a thickness in the range can be stably formed by application.

<Functional Layer>

The optical film of the present invention may include one or more functional layers on the other surface (second surface, i.e., the surface on the side where the first and second layers are not disposed) of the transparent film. The functional layers are, for example, a high refractive index layer, a medium refractive index, and a low refractive index layer. In such a case, in light of the optical design for providing antireflection, at least one layer disposed on the other surface of the transparent film is preferably a nigh refractive index layer having an in-plane refractive index satisfying the relationship: functional layer>transparent film.

In particular, the functional layer is preferably a hard coat layer being a high, refractive index layer (the hard coat layer generally has an average in-plane refractive index of about 1.48 to 2). In light of the optical design for providing antireflection, the layer disposed on the other surface of the transparent film preferably has an in-plane refractive index satisfying the relationship:

hard coat layer>transparent film.

Specifically, as shown in FIGS. 3 to 5, the optical film of the present invention preferably includes a hard coat layer disposed on the surface on the other side of the transparent film. The hard coat layer is preferably a high refractive index layer having a property as a hard coat layer. Examples of the material forming the hard coat layer include (meth)acrylic acid polymers, acrylic acid polymers, urethane polymers, and copolymers of (meth)acrylic acid, monomers and urethane monomers; those described in Japanese Patent Laid-Open No. 2000-9008; and those described in International Publication No. 00/46617.

In addition, the functional layer (in particular, the hard coat layer) preferably has a thickness 0.4 to 35 µm, more preferably 5 to 20 µm, from the viewpoint of providing sufficient durability and shock resistance.

The optical film of the present invention may have a low refractive index layer having an average in-plane refractive index lower than the average in-plane refractive index of the high refractive index layer, such as a hard coat layer, on the further outer side surface than the high refractive index layer. The low refractive index layer can reduce the reflection of outer light to further improve the picture-displaying performance. This effect can be achieved at a low refractive index layer that has an average in-plane refractive index of about 1.3 to 1.47; however, the average in-plane refractive index may have any other value outside such a range. From the viewpoint of the optical design for antireflection, the average refractive index of the low refractive index layer is preferably lower than the average in-plane refractive index of the transparent film.

Though the reflectance can be reduced, by disposing the low refractive index layer only, the antireflection may be enhanced by a combination of a high refractive index layer having a high refractive index and a low refractive index layer having a low refractive index. Examples of such structures include structures composed of two layers, i.e., a high refractive index layer and a low refractive index layer from the transparent film side in this order; structures composed of three layers having different refractive indices, i.e., a hard coat layer, a high refractive index layer, and a low refractive index layer stacked in this order, and a medium, refractive index layer (a layer having a refractive index higher than that of the low refractive index layer and lower than that of the high refractive index layer), a high refractive index layer, and a low refractive index layer stacked in this order; structures composed of four layers having different refractive indices, i.e., a hard coat layer, a medium refractive index layer, a high refractive index layer, and low retractive index layer stacked in this order; and structures including a plurality of laminated antireflection layers. Among these structures, a structure composed of a medium refractive index layer, a high refractive index layer, and a low refractive index layer disposed in this order on a hard cost layer is preferred from the views of durability, optical characteristics, cost, productivity, and other factors. These structures are described in, for example, Japanese Patent Laid-open No. Hei 8-122504, Japanese Patent Laid-Open No. Hei 8-110401, Japanese Patent Laid-Open No. Hei 10-300902, Japanese Patent Laid-Open. No. 2002-243906, and Japanese Patent Laid-Open No. 2000-111706. Japanese Patent Laid-Open No. 2008-262187 describes an antireflection film having a three-layer structure showing high robustness against variation in thickness. The antireflection film having the three-layer structure can reduce the average of reflectance to 0.5% or less when it is disposed on the surface of a picture display apparatus and can significantly reduce reflection to provide a picture showing an excellent stereoscopic effect. Furthermore, layers may be each provided with different functions. For example, a low refractive index layer may have an antifouling property, a nigh refractive index layer may have an antistatic property, and a hard coat layer may have an antistatic property (e.g., Japanese Patent Laid-Open No. Hei 10-206603, Japanese Patent Laid-Open No. 2002-243906, and Japanese Patent Laid-Open No. 2007-264113).

Specific examples of the layer structure having a high refractive index layer or a low refractive index layer are shown below, where the high refractive index layer (1) and the high refractive index layer (2) are high refractive index layers having different refractive indices from each other. The examples are:

High refractive index layer (preferably hard coat layer),
Low refractive index layer,
High refractive index layer/low refractive index layer,
high refractive index layer (1)/high refractive index layer (2)/low refractive index layer,
High refractive index layer (1)/medium refractive index layer/high refractive index layer (2)/low refractive index layer,
High refractive index layer (preferably hard coat layer)/low refractive index layer.
High refractive index layer (1) (preferably hard coat layer)/high refractive index layer (2)/low refractive index layer, and
High refractive index layer (1) (preferably hard coat layer)/medium refractive index layer/high refractive index layer (2)/low refractive index layer.

<Polarizing Film>

In the present invention, an ordinary linear polarizing film can be used as a polarizing film. The polarising film, may be a stretched film or may be a layer formed by application. Examples of the former include films prepared by dyeing a stretched film, of polyvinyl alcohol with, for example, iodine or a dichroic dye. Examples of the latter include layers prepared by application of a composition containing a dichroic liquid crystal dye and fixing the resulting layer in a predetermined alignment state.

Throughout, the specification, the term "polarizing film" refers to a linear polarizing film.

In the case of pasting the optical, film of the present invention and a linear polarizing film, the surface on the first surface side of the transparent film of the optical film of the present invention; i.e., the surface on the side having the first layer is preferably pasted to a surface of the linear polarising film, <Liquid-Crystal Cell>

The liquid-crystal cell for use in the 3D image display device to be used in the 3D image display system of the invention is preferably a VA-mode, OCB-mode, IPS-mode or TN-mode cell, to which, however, the invention is not limited.

In the TN-mode liquid-crystal cell, rod-shaped liquid-crystal molecules are aligned substantially horizontally and are further twisted at from 60 to 120° under the condition of no voltage application thereto. The TN-mode liquid-crystal cell is most used in color TFT liquid-crystal display devices, and is described in many publications.

In the VA-mode liquid-crystal cell, rod-shaped liquid-crystal molecules are aligned substantially vertically under the condition of no voltage application thereto. The VA-mode liquid-crystal cell includes (1) a narrowly-defined VA-mode liquid-crystal cell where rod-shaped liquid-crystal, molecules are aligned substantially vertically under the condition of no voltage application thereto but are aligned substantially horizontally under the condition of voltage application thereto (as described in JP-A 2-176625), and in addition thereto, further includes (2) an MVA-made liquid-crystal cell in which the VA-mode has been multidomained (as described in SID97, Digest of Tech. Papers (preprints) 28 (1997) 845), (3) an n-ASM mode liquid-crystal cell in which rod-shaped liquid-crystal molecules are aligned substantially vertically under the condition of no voltage application thereto and are aligned in a twisted multidomain alignment under the condition of voltage application thereto (as described in preprints of Discussion in Japanese Liquid Crystal Society, 58-59 (1998)), and (4) a SURVIVAL-mode liquid-crystal cell (as announced in LCD International 98). In addition, the liquid-crystal cell may be in any mode of a PVA (patterned vertical alignment)-mode cell, an OP (optical alignment)-mode cell or a PSA (polymer-sustained alignment)-mode cell. The details of these modes are described in JP-A 2006-215326 and JP-T 2008-538819.

In the IPS-mode liquid-crystal cell, rod-shaped liquid-crystal molecules are aligned substantially horizontally to the substrate, and when an electric field parallel to the substrate face is given thereto, the liquid-crystal molecules respond planarly thereto. In the IPS-mode liquid-crystal cell, idle panel is in a black display state under the condition of no electric field application thereto, and the transmission axes of the pair of upper and lower polarizers are perpendicular to each other. A method of using an optical compensatory sheet to reduce the light leakage in oblique directions at the time of black level of display to thereby expand the viewing angle is disclosed in JP-A 10-54982, 11-202323, 9-292522, 11-133408, 11-305217, 10-307231, etc.

<Polarizing Plate for Stereo Picture Display System>

In the stereo picture display system of the present invention, in order to allow a viewer to recognize a stereo picture, in particular, called a 3D picture, the picture is recognized through a polarizing plate. One configuration of the polarizing plate is polarized glasses. In a configuration where the optical film of the present invention is a λ/4 plate and forms, together with a polarizing film, a circularly polarized picture, circularly polarized glasses are used. The circularly polarized glasses may be active shutter glasses or passive glasses.

EXAMPLES

The invention is described in more detail with reference to the following Examples. In the following Examples, the material used, its amount and ratio, the details of the treatment and the treatment process may be suitably modified or changed not overstepping the gist and the scope of the invention. Accordingly, the invention should not be limitatively interpreted by the Examples mentioned below.

In Examples and Comparative Examples, Re(550) and Rth (550) are values measured with an automatic birefractometer, KOBRA-21ADH (manufactured by Oji Keisoku Kiki Co., Ltd.) at a wavelength of 550 nm, unless specifically defined otherwise. The refractive index was directly measured with an Abbe's refractometer or quantitatively evaluated by measuring the spectral reflection spectrum or spectroscopic eilipsometry. The refractive index and film thickness of each layer was measured by using a thickness-measuring reflex-spectroscopic analyzer (manufactured by Otsuka electronics Co. Ltd.). The refractive index was measured at a wavelength of 550 nm. The optical thickness is a product of the film thickness and the refractive index.

Production of Optical Film of Comparative Example 1

Production of Transparent Film
<<Aikali Saponification Treatment>>

The cellulose acetate film (TD80UL by FUJIFILM) was made to pass through dielectric heating roils at a temperature of 60 degrees Celsius to thereby elevate the film surface temperature up to 40 degrees Celsius, and then using a bar coater, an alkali solution having the formulation mentioned below was applied onto one surface of the film in a coating amount of 14 ml/m². Then, this was heated at 110 degrees Celsius and conveyed below a steam-type far IR heater made by Noritake Company Ltd., for 10 seconds. Subsequently, also using a bar coater, pure water was applied to the film in an amount of 3 ml/m². Next, this was washed with water using a fountain coater, and then dewatered using an air knife, and this operation was repeated three times. Subsequently, the film was conveyed in a drying zone at 70 degrees Celsius for 10 seconds, and dried therein thereby giving an alkali-saponified cellulose acetate film 1. The cellulose acetate film 1 had an average in-plane refractive index, of 1.48 μm and a thickness of 80 μm.

| Formulation of Alkali Solution (part by mass) | |
| --- | --- |
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

Formation of Alignment Film (Second Layer)

An application liquid for an alignment film having the following composition was continuously applied to a saponified long cellulose acetate film with a wire bar #14, followed by drying with, warm air of 60° C. for 50 seconds and then with warm air of 100° C. for 120 seconds to form an alignment film having a thickness shown in Table 2. The alignment film had an average in-plane refractive index of 1.53 and a thickness of 700 nm.

| Composition of the application liquid for alignment film: | |
| --- | --- |
| Modified polyvinyl alcohol shown below: | 10 parts by mass |
| Water: | 371 parts by mass |
| Methanol: | 119 parts by mass |
| Glutaraldehyde: | 0.5 parts by mass |
| Photopolymerization initiator (Irgacure 2959, manufactured by Ciba Japan K.K.): | 0.3 parts by mass |

Modified polyvinyl alcohol

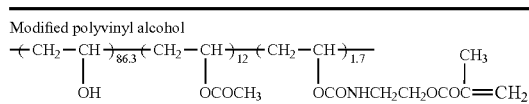

Formation of Optically Anisotropic Layer (First Layer) Containing Discotic Liquid Crystal Compound The resulting alignment film was continuously subjected to rubbing treatment. On this occasion, the conveying direction was parallel to the longitudinal direction of the long film, and the rotary axis of the rubbing roller was in the direction of 45° clockwise from the longitudinal direction of the film.

An application liquid A having the following composition containing a discotic liquid crystal compound was continuously applied onto the alignment film with a wire bar. The film was conveyed at a transport velocity (V) of 36 m/min. After the application, removal of the solvent of the application liquid and alignment aging of the discotic liquid, crystal compound were performed by heating with warm air of 120° C. for 90 seconds. Subsequently, the alignment of the liquid crystal compound was fixed by UV irradiation at 80° C. to form an optically anisotropic layer having a thickness of 1.6 μm. The optically anisotropic layer had an average in-plane refractive index of 1.6.

| Composition of application liquid (A) for optically anisotropic layer: | |
| --- | --- |
| Discotic liquid crystal compound shown below: | 91 parts by mass |
| Acrylate monomer *1: | 5 parts by mass |
| Photopolymerization initiator (Irgacure 907, manufactured by Ciba-Geigy Co.): | 3 parts by mass |
| Sensitizer (Kayacure DETX, manufactured by Nippon Kayaku Co., Ltd.): | 1 part by mass |
| Pyridinium salt shown below: | 0.5 parts by mass |
| Fluorine-based polymer (FP1) shown below: | 0.2 parts by mass |
| Fluorine-based polymer (FP3) shown below: | 0.1 parts by mass |
| Methyl ethyl ketone: | 189 parts by mass |

*1: As the acrylate monomer, ethylene oxide-modified trimethylolpropane triacrylate (V#360, manufactured by Osaka Organic Chemical Industry Ltd.) was used.

[Discotic liquid crystal compound]

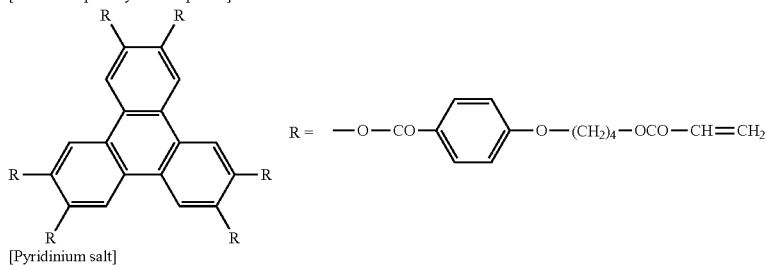

[Pyridinium salt]

-continued

Composition of application liquid (A) for optically anisotropic layer:

[Fluorine-based polymer (FP1)]

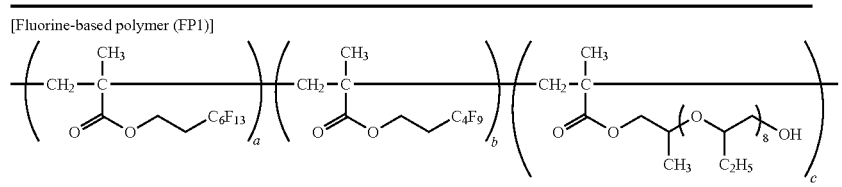

a/b/c = 20/20/60 wt %  Mw = 16000

[Fluorine-based polymer (FP3)]

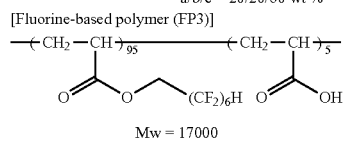

Mw = 17000

The resulting optical film showed a Re(550) of 125 nm and an Rth(550) of −3 nm at a wavelength of 550 nm. The direction of the slow axis was orthogonal to the rotary axis of the rubbing roller. That is, the slow axis was in the direction of 45° counterclockwise from the longitudinal direction of the cellulose acetate film 1 as the support. It was thus confirmed that the average tilt angle of the disk planes of the discotic liquid crystal molecules was 90° with respect to the film, plane, that is, the discotic liquid crystal molecules were aligned such that the disk planes were perpendicular to the film plane.

Formation of Hard Coat Layer and Low Refractive Index Layer

The following composition was charged in a mixing tank, stirred, and filtered through a polypropylene filter having a pore size of 0.4 μm to prepare an application liquid (solid concentration: 58% by mass) for hard coat layer,

| | |
|---|---|
| Solvent: methyl acetate: | 36.2 parts by mass |
| Solvent: methyl ethyl ketone: | 36.2 parts by mass |
| Monomer (a): PETA: | 77.0 parts by mass |
| Monomer (b): urethane monomer: | 20.0 parts by mass |
| Photopolymerization initiator (Irgacure 184, manufactured by Ciba Specialty Chemicals Corp.): | 3.0 parts by mass |
| Leveling agent (SP-13): | 0.02 parts by mass |

The compounds used are shown below.

[PETA: a Compound Manufactured by Shin-Nakamura Chemical Co., Ltd. Having a Structure Shown Below and Having a Mass-Average Molecular Weight of 325 and 3.5 (Average) Functional Groups Per Molecule]

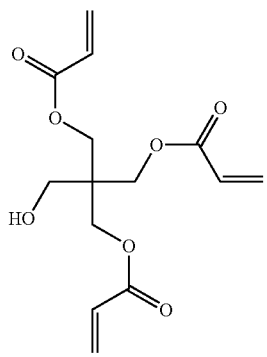

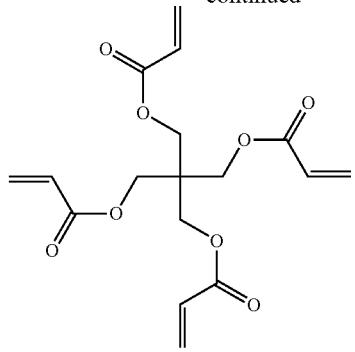

[Urethane Monomer: a Compound Having a Structure Shown Below and Having a Mass-Average Molecular Weight of 596 and Four Functional Groups Per Molecule]

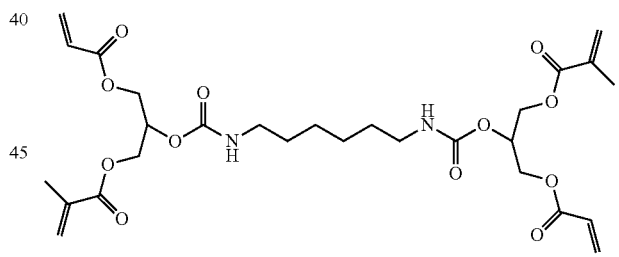

[Leveling Agent (SP-13):]

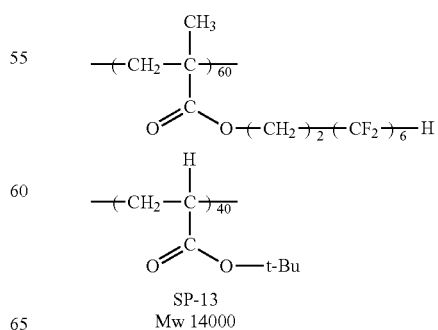

SP-13
Mw 14000

<Preparation of Coating Liquid for Low Refractive-Index Layer>

The following ingredients were dissolved in MEK/MMPG-AC=85/15 mixture (mass ratio) according to the following formulation, to give a coating liquid for a low refractive index layer having the solid content of 5% by mass.

Formulation of Coating Liquid for Low Refractive-Index Layer

| | |
|---|---|
| Perfluoroolefin copolymer shown below | 15 parts by mass |
| DPHA | 7 parts by mass |
| Defensor MCF-323 | 5 parts by mass |
| Fluorine-containing polymerizable compound shown below | 20 parts by mass |
| Hollow silica micropractice for solid concentration | 50 parts by mass |
| IRGACURE 127 | 3 parts by mass |

Perfluoroolefin copolymer

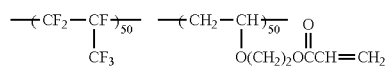

M.W. 50000

In the formula, 50/50 means the molar ratio.
Fluorine-containing polymerizable compound

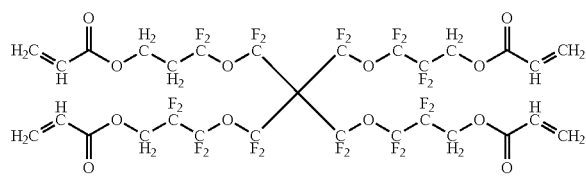 [SMILES: C=CC(=O)OCCC(F)(F)OC(F)(F)C(C(F)(F)OC(F)(F)C(F)(F)COC(=O)C=C)(C(F)(F)OC(F)(F)C(F)(F)COC(=O)C=C)C(F)(F)OC(F)(F)C(F)(F)COC(=O)C=C]

DPKA: a mixture of dipentaerythritol pentaacrylate and dipentaerythritol hexaacrylate, manufactured by Nippon Kayaku Co., Ltd.

Difencer MCF-323: fluorine surfactant, manufactured by Dainippon Ink & Chemicals, Inc.

Irgacure 127: photopolymerization initiator, manufactured by Ciba Japan K.K.

Hollow silica: dispersion of hollow silica particles (average particle size: 45 nm, refractive index: 1.25, surface: treated with a silane coupling agent having an acryloyl group, concentration in MEK: 20%)

MEK: methyl ethyl ketone

MMPGAc: propylene glycol monomethyl ether acetate

The application liquid for hard coat layer was applied onto the back surface of the cellulose acetate film 1 (i.e., the surface on the side where the optically anisotropic layer and the alignment film were not formed) with a die coater (applied solid amount: 12 g/m$^2$). After drying at 100*0 for 60 seconds, the application layer was cured by irradiation with ultraviolet light at an illuminance of 400 mW/cm$^2$ and a dose of 150 mJ/cm$^2$ with a 160 W/cm air cooling metal halide lamp (manufactured by Eye Graphics Co., Ltd.) under nitrogen purging to provide an atmosphere of an oxygen concentration of 0.1 vol % to form a hard coat layer. The application liquid for low refractive index layer was applied onto the surface of the hard coat layer, followed by drying and curing to form a low refractive index layer. The drying was performed at 70° C. for 60 seconds, and ultraviolet light irradiation was performed at an illuminance of 600 mW/cm$^2$ and a dose of 300 mJ/cm$^2$ with a 240 W/cm air cooling metal halide lamp (manufactured by Eye Graphics Co., Ltd.) under nitrogen purging to provide an atmosphere of an oxygen concentration of 0.1 vol %.

The low refractive index layer had a refractive index of 1.34 and a thickness of 35 nm.

The moisture permeability amount of the cellulose acetate film 1 used at 40° C. and 90% RH was 430 g/m$^2$/day.

Thus, an optical film for Comparative Example 1 having the same structure as that shown in FIG. 4 was produced.

Production of Optical Film of Example 1

A cellulose acetate film 1 was prepared as in Comparative Example 1, and an alignment film was formed on a surface of the cellulose acetate film 1 as in Comparative Example 1.

An application liquid B having the following composition containing a discotic liquid crystal compound was continuously applied to the rubbing treated, surface of the alignment film with a wire bar #3.6. The transport velocity (V) of the film was adjusted to 20 m/min. Removal of the solvent of the application liquid and alignment aging of the discotic liquid crystal compound were performed by heating with warn air of 130° C. for 90 seconds. Subsequently, the alignment of the liquid crystal compound was fixed by UV irradiation at 80° C. to form an optically anisotropic layer having an average in-plane refractive index of 1.6 and a thickness of 1.54 μm.

Composition of application liquid (B) for optically anisotropic layer:

| | |
|---|---|
| Discotic liquid crystal compound (DLC1) shown below: | 91 parts by mass |
| Ethylene oxide-modified trimethylolpropane triacrylate (V#360, manufactured by Osaka Organic Chemical Industry Ltd.): | 5 parts by mass |
| Photopolymerization initiator (Irgacure 907, manufactured by Ciba-Geigy Co.): | 3 parts by mass |
| Sensitizer (Kayacure DETX, manufactured by Nippon Kayaku Co., Ltd): | 1 part by mass |
| Pyridinium salt (alignment agent 1) shown below: | 0.5 parts by mass |
| Fluorine-based polymer (FP1) shown below: | 0.2 parts by mass |
| Fluorine-based polymer (FP2) shown below: | 0.1 parts by mass |
| Solvent (methyl ethyl ketone: MEK): | 241 parts by mass |

DLC1

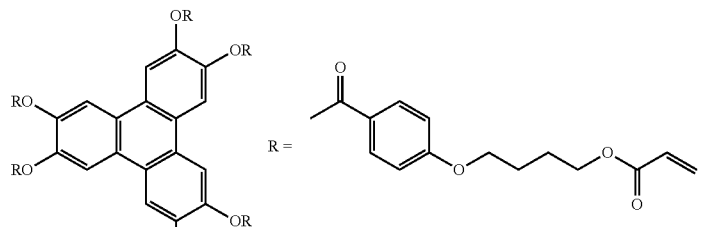

[Pyridinium salt]

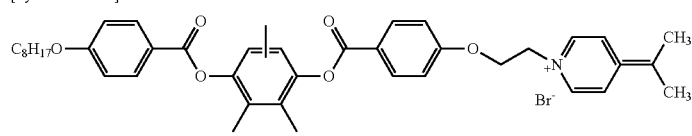

[Fluorine-based polymer (FP1)]

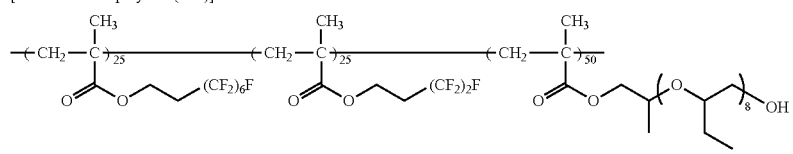

[Fluorine-based polymer (FP2)]

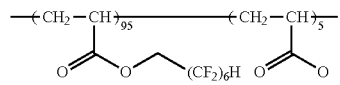

In the structural formula of the fluorine-based polymer (FP1), "25"s and "50" represent molar ratios of repeating units of the polymer. Similarly, in the structural formula of the fluorine-based polymer (FP2), "95" and "5" represent molar ratios.

The direction of the slow axis of the optical film in Example 1 was parallel to the rotary axis of the rubbing roller. That is, the slow axis was in the direction of 45° clockwise from the longitudinal direction of the support. Separately, a layer containing the discotic liquid crystal compound was formed on a glass substrate as the support instead of the cellulose acetate film 1, and the Re(0), Re(40), and Re(−40) thereof were measured with KOBRA21 ADH to confirm to be 125 nm, 116 nm, and 116 nm, respectively. These results show that, the average tilt angle of the disk planes of the discotic liquid crystal molecules was 90° with respect to the film plane, that is, the discotic liquid crystal molecules were aligned so as to be perpendicular to the film plane.

A hard coat layer and a low refractive index layer were formed on the back surface (the surface on the side where the alignment film and the optically anisotropic layer were not formed) of the cellulose acetate film 1 as in Comparative Example 1 to produce an optical film for Example 1 having the same structure as that shown in FIG. 4.

Comparative Examples 2 to 4 and Examples 2 to 12

Application liquids were prepared by changing the composition of the application liquid (B) for optically anisotropic layer. Optical films of Comparative Examples 2 to 4 were produced as in Example 1 except that the amount and heating temperature of the application liquids were changed such that the value of Re(0) measured with KOBRA21 ADR was 125 nm.

The direction of the slow axis of each of the resulting optical films was orthogonal, to the rotary axis of the rubbing roller. That is, the slow axis was in the direction of 45° clockwise from the longitudinal direction of the cellulose acetate film 1 as the support. As in Comparative Example 1, it was confirmed that the average tilt angle of the disk planes of the discotic liquid crystal molecules was 90° with respect, to the film plane, that is, the discotic liquid crystal molecules were aligned so as to be perpendicular to the film plane.

The structures of the discotic liquid crystal compound DLC2 and discotic liquid crystal compound. DLC3 used are shown below.

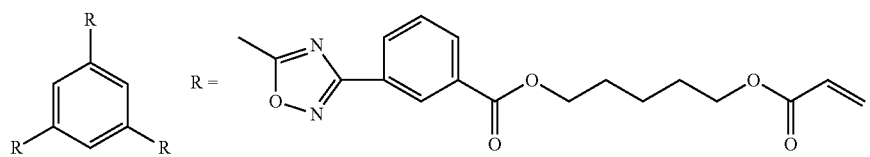

DLC2

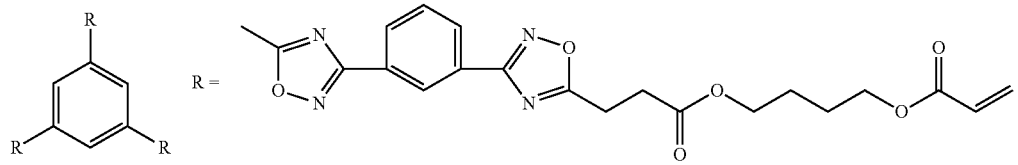

DLC3

A hard coat layer and a low refractive index layer were formed, as in Comparative Example 1, on the back surface (the surface on the side where the alignment, film and the optically anisotropic layer were not formed) of each cellulose acetate film 1 provided with the optically anisotropic layer to produce optical films for Examples 2 to 12 and Comparative Examples 2 to 4 each having the same structure as that shown in FIG. 4.

Production of Polarizing Plate for Picture Display Apparatus

A polyvinyl alcohol (PVA) film having a thickness of 80 µm was immersed in an aqueous iodine solution having an iodine concentration of 0.05% by mass at 30° C. for 60 seconds for staining and was then immersed in an aqueous boric acid solution having a boric acid concentration of 4% by mass for 60 seconds. The film was drawn up to five-fold the initial length in the longitudinal direction during the immersion in the aqueous boric acid solution and was then dried, at 50° C. for 4 minutes to prepare a polarizing film, having a thickness of 20 µm.

An alkali saponified phase difference film (manufactured by Fujifilm Corp., Re(550)=50 nm, Rth(550)=125 nm) for VA was pasted to one surface of the polarizing film and any of the optical films produced, in Examples and Comparative Examples above was pasted to the other surface of the polarizing film with an adhesive agent or bonding agent to produce a polarizing plate for picture display apparatus.

The optical films were each pasted, to the polarizing film at the optically anisotropic layer side.

Production of Picture Display Apparatus

The front polarizing plate was removed from SAMSUNG UN40C7000WF, and the resulting polarizing plate for picture display apparatus was pasted thereto with an adhesive agent or bonding agent such that the phase difference film for VA was disposed on the liquid crystal cell side.

Evaluation of Minute Unevenness in Interference

The resulting picture display apparatuses were evaluated for the minute interference unevenness into six grades by the following method.

The front of each display apparatus was illuminated with a three-wavelength fluorescent lamp (National PA-LOOK fluorescent lamp FL20SS EX-D/18), and interference unevenness was observed and evaluated by the following criteria:

A: no minute interference unevenness was observed,

B: minute interference unevenness was hardly observed, and

C: minute interference unevenness was observed.

The evaluation results are shown in the following table.

TABLE 2

| | Basic Configuration | Surface Layer | | Transparent Film | | | Alignment Film | |
|---|---|---|---|---|---|---|---|---|
| | | Ln layer *1 | HC layer *2 | Material *3 | Refractive Index *4 | Thickness µm | Refractive Index *4 | Thickness nm |
| Comparative Example 1 | FIG. 4 | Present | Present | CA | 1.48 | 80 | 1.53 | 700 |
| Example 1 | FIG. 4 | Present | Present | CA | 1.48 | 80 | 1.53 | 700 |
| Example 2 | FIG. 4 | Present | Present | CA | 1.48 | 80 | 1.53 | 700 |
| Example 3 | FIG. 4 | Present | Present | CA | 1.48 | 80 | 1.53 | 700 |
| Comparative Example 2 | FIG. 4 | Present | Present | CA | 1.48 | 80 | 1.53 | 700 |
| Example 4 | FIG. 4 | Present | Present | CA | 1.48 | 80 | 1.53 | 700 |
| Example 5 | FIG. 4 | Present | Present | CA | 1.48 | 80 | 1.53 | 700 |
| Example 6 | FIG. 4 | Present | Present | CA | 1.48 | 80 | 1.53 | 700 |
| Comparative Example 3 | FIG. 4 | Present | Present | CA | 1.48 | 80 | 1.53 | 700 |
| Example 7 | FIG. 4 | Present | Present | CA | 1.48 | 80 | 1.53 | 700 |
| Example 8 | FIG. 4 | Present | Present | CA | 1.48 | 80 | 1.53 | 700 |
| Example 9 | FIG. 4 | Present | Present | CA | 1.48 | 80 | 1.53 | 700 |
| Comparative Example 4 | FIG. 4 | Present | Present | CA | 1.48 | 80 | 1.53 | 700 |
| Example 10 | FIG. 4 | Present | Present | CA | 1.48 | 80 | 1.53 | 700 |
| Example 11 | FIG. 4 | Present | Present | CA | 1.48 | 80 | 1.53 | 700 |
| Example 12 | FIG. 4 | Present | Present | CA | 1.48 | 80 | 1.53 | 700 |

TABLE 2-continued

| | | Optically Anisotropic Layer | | | Optical Characteristics | | Evaluation of Minute Unevenness in |
|---|---|---|---|---|---|---|---|
| | Main Component *5 | Refractive Index *4 | Thickness nm | Optical Thickness nm | Re nm | Rth nm | Interference in Interference |
| Comparative Example 1 | DLC | 1.8 | 1600 | 2560 | 125 | −3 | C |
| Example 1 | DLC | 1.6 | 1540 | 2464(N = 10) | 125 | −3 | B |
| Example 2 | DLC | 1.6 | 1500 | 2400(N = 10) | 125 | −3 | A |
| Example 3 | DLC | 1.6 | 1470 | 2352(N = 10) | 125 | −3 | B |
| Comparative Example 2 | DLC | 1.6 | 1420 | 2272 | 125 | −3 | C |
| Example 4 | DLC | 1.6 | 1365 | 2184(N = 9) | 125 | −3 | B |
| Example 5 | DLC | 1.6 | 1340 | 2144(N = 9) | 125 | −3 | A |
| Example 6 | DLC | 1.6 | 1310 | 2096(N = 9) | 125 | −3 | B |
| Comparative Example 3 | DLC | 1.6 | 1255 | 2008 | 125 | −3 | C |
| Example 7 | DLC | 1.6 | 1205 | 1928(N = 8) | 125 | −3 | B |
| Example 8 | DLC | 1.6 | 1175 | 1880(N = 8) | 125 | −3 | A |
| Example 9 | DLC | 1.6 | 1145 | 1832(N = 8) | 125 | −3 | B |
| Comparative Example 4 | DLC | 1.8 | 1095 | 1752 | 125 | −3 | C |
| Example 10 | DLC | 1.8 | 1040 | 1854(N = 7) | 125 | −3 | B |
| Example 11 | DLC | 1.8 | 1015 | 2624(N = 7) | 125 | −3 | A |
| Example 12 | DLC | 1.8 | 990 | 1584(N = 7) | 125 | −3 | B |

*1: Ln layer means low refractive index layer;
*2: HC layer means hard coat layer;
*3: CA means cellulose acetate;
*4: average in-plane refractive index is shown; and
*5: DLC means discotic liquid crystal.

Production of Optical Film of Comparative Example 5

As in Comparative Example 1, cellulose acetate film 1 was prepared.

An alignment film was formed on a surface of the cellulose acetate film 1 as in Comparative Example 1 except that the rotary axis of the rubbing roller in the rubbing treatment of the alignment film was in the direction of 45° counterclockwise.

An optically anisotropic layer was formed on the rubbing treated surface of the alignment film as in Comparative Example 1 to produce a laminate A.

A commercially available low reflection film, "Clear LR CV-LC" (manufactured by Fujifilm Corp.), having a cellulose acylate film as a support was used. This low reflection film is a laminate of a hard coat layer and a low refractive index layer laminated in this order on a surface of a cellulose acylate film.

The laminate A was pasted to the back surface (the surface on the side where the hard coat layer and the low refractive index layer were not disposed) of the support of the low reflection film with a pasting layer (SK2057, manufactured by Soken Chemical & Engineering Co., Ltd.). The optically anisotropic layer containing a liquid crystal compound of the laminate A was pasted to the back surface of the support of the low reflection film. The pasting layer had a refractive index of 1.47 and a thickness of 25 μm.

Thus, an optical film for Comparative Example 5 having the same structure as that shown in FIG. 5 was produced.

Production of Optical Film of Comparative Example 6

As in Comparative Example 1, a cellulose acetate film 1 was prepared.

An alignment film was formed on a surface of the cellulose acetate film 1 as in Comparative Example 1 except that the rotary axis of the rubbing roller in the rubbing treatment of the alignment film was in the direction of 45° counterclockwise.

An optically anisotropic layer was formed on the rubbing treated surface of the alignment film as in Comparative Example 2 to produce a laminate B.

A commercially available low reflection film, "Clear LR CV-LC" (manufactured by Fujifilm Corp.), having a cellulose acylate film as a support was used.

The laminate B was pasted to the back surface (the surface on the side where the hard coat layer and the low refractive index layer were not disposed) of the support of the low reflection film with a pasting layer (SK2057, manufactured by Soken Chemical & Engineering Co., Ltd.). The optically anisotropic layer containing a liquid crystal compound of the laminate B and the back surface of the support of the low reflection film, were pasted to each other. The pasting layer had a refractive index of 1.47 and a thickness of 25 μm.

Thus, an optical film for Comparative Example 6 having the same structure as that shown in FIG. 5 was produced.

Production of Optical Film for Example 13

As in Comparative Example 1, a cellulose acetate film 1 was prepared.

An alignment film was formed on a surface of the cellulose acetate film 1 as in Comparative Example 1 except that the rotary axis of the rubbing roller in the rubbing treatment of the alignment film was in the direction, of 45° counterclockwise.

An optically anisotropic layer was formed on the rubbing treated surface of the alignment film as in Example 2 to produce a laminate C.

A commercially available low reflection film, "Clear LR CV-LC" (manufactured by Fujifilm Corp.), having a cellulose acylate film as a support was used.

The laminate C was pasted to the back surface (the surface on the side where the hard coat layer and the low refractive index layer were not disposed) of the support of the low reflection film with a pasting layer (SK2057, manufactured by Soken Chemical & Engineering Co., Ltd.). The optically anisotropic layer containing a liquid crystal compound of the laminate C and the back surface of the support of the low reflection film were pasted to each other. The pasting layer had a refractive index of 1.47 and a thickness of 25 μm.

Thus, an optical film for Example 13 having the same structure as that shown in FIG. 5 was produced.

Polarizing plates were produced with the optical films of Example 13 and Comparative Examples 5 and 6 as in above. Picture display apparatuses were produced with the polarizing plates as in above and were evaluated for minute interference unevenness as in above. The results are shown in Table 3, manufactured by JSR Ltd.) were added 61.9 parts by mass of methyl ethyl ketone, 3.4 parts by mass of methyl isobutyl ketone, and 1.1 parts by mass of cyclohexanone. The mixture was stirred and was filtered through a polypropylene filter having a pore size of 0.4 μm to prepare an application liquid for high refractive index layer.

Formation of Medium Refractive Index Layer, High Refractive Index Layer, and Low Refractive Index Layer In production of optical films of Example 2 and Comparative Examples 1 and 2, after formation of each hard coat layer, the application liquid for medium refractive index layer was applied onto the hard coat layer. The drying was performed at 90° C. for 30 seconds, and ultraviolet light irradiation curing was performed at an illuminance of 300 mW/cm$^2$ and a dose of 240 mJ/cm$^2$ with a 180 W/cm air cooling metal halide lamp

TABLE 3

Figure 6:
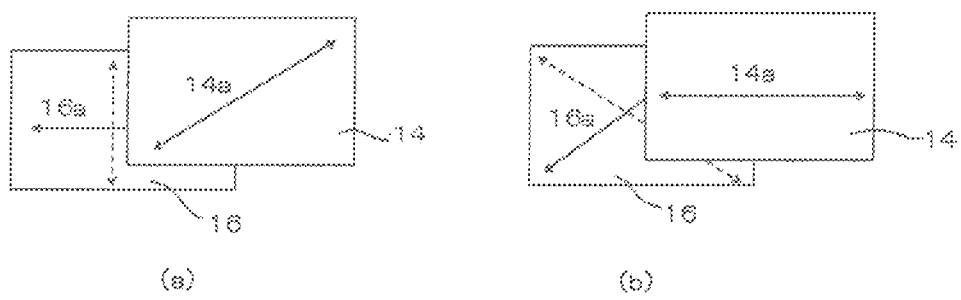
FIGS. 6A and 6B are views schematically illustrating a relationship between the axes of an optical film and a polarizing film in an example of the polarizing plate of the present invention.

| | | Surface Layer | | Transparent Film | | | Pasting Layer | | Optically Anisotropic Layer | |
|---|---|---|---|---|---|---|---|---|---|---|
| | | | | | | | | | Main | |
| | Basic Configuration | Ln layer *1 | HC layer *2 | Material *3 | Refractive Index *4 | Thickness μm | Refractive Index *4 | Thickness μm | Component *5 | Refractive Index *4 |
| Comparative Example 5 | FIG. 5 | Present | Present | CA | 1.48 | 80 | 1.47 | 25 | DLC | 1.8 |
| Example 13 | FIG. 6 | Present | Present | CA | 1.48 | 80 | 1.47 | 25 | DLC | 1.6 |
| Comparative Example 6 | FIG. 6 | Present | Present | CA | 1.48 | 80 | 1.47 | 25 | DLC | 1.6 |

| | Optically Anisotropic Layer | | Alignment Film | | Optical Characteristics | | Evaluation of Minute |
|---|---|---|---|---|---|---|---|
| | Optical Thickness nm | Thickness nm | Refractive Index *4 | Thickness nm | Re nm | Rth nm | Unevenness in Interference |
| Comparative Example 5 | 1600 | 2580 | 1.53 | 700 | 125 | −3 | C |
| Example 13 | 1500 | 2400 (N = 10) | 1.53 | 700 | 125 | −3 | A |
| Comparative Example 6 | 1420 | 2272 | 1.53 | 700 | 125 | −3 | C |

*1: Ln layer means low refractive index layer;
*2: HC layer means hard coat layer;
*3: CA means cellulose acetate;
*4: average in-plane refractive index is shown; and
*5: DLC means discotic liquid crystal.

Production of Optical Films of Example 14 and Comparative Examples 7 and 10

Preparation of Application Liquid for Medium Refractive Index Layer

A dispersion of phosphorus-containing tin oxide (PTO) (ELCOM JX-1001PTV, manufactured by Catalysts & Chemicals Industries Co., Ltd.) was mixed with a mixture of dipentaerythritol pentaacrylate and dipentaerythritol hexaacrylate (DPHA) to prepare an application liquid for medium refractive index layer, which showed a refractive index of 1.62 after curing.

Preparation of Application Liquid for High Refractive Index Layer

To 15.7 parts by mass of a ZrO$_2$ fine particles-containing hard coating agent (Desolite Z7404, refractive index: 1.72, solid concentration: 60% by mass, zirconium oxide fine particle content in solid: 70% by mass, average particle size of zirconium oxide fine particles: about 20 nm, solvent composition; methyl isobutyl ketone/methyl ethyl ketone=9/1, (manufactured by Eye Graphics Co., Ltd.) under nitrogen purging to provide an atmosphere of an oxygen concentration of 1.0 vol %. The formed medium refractive index layer had a refractive index of 1.62 and a thickness of 60 nm.

Subsequently, the application liquid for high refractive index layer was applied onto the formed medium refractive index layer. The drying was performed at 90° C. for 30 seconds, and ultraviolet light irradiation curing was performed at an illuminance of 300 mW/cm$^2$ and a dose of 240 ma/cm$^2$ with a 240 W/cm air cooling metal, halide lamp (manufactured by Eye Graphics Co., Ltd.) under nitrogen purging to provide an atmosphere of an oxygen concentration of 1.0 vol %. The formed high refractive index layer had a refractive index of 1.72 and a thickness of 110 nm.

Subsequently, the application liquid for low refractive index layer was applied onto the resulting high refractive index layer as in above to form, a low refractive index layer.

As described above, optical films of Example 14 and Comparative Examples 7 and 10 were produced so as to comprise an alignment film and an optically anisotropic layer on a surface of a cellulose acetate film 1 and a hard coat layer, a medium refractive index layer, a high refractive index layer, and a low refractive index layer laminated in this order on the back surface (i.e., the surface on the side where the alignment film, and the optically anisotropic layer were not formed) of the cellulose acetate film 1.

Production of Optical Films of Example 15 and Comparative Examples 8 and 11

The optical films after formation of respective hard coat layers in the production of optical films of Example 2 and Comparative Examples 1 and 2 were used as the optical films of Example 15 and Comparative Examples 8 and 11.

As described above, optical films of Example 15 and Comparative Examples 8 and 11 were produced so as to comprise an alignment, film and an optically anisotropic layer on a surface of a cellulose acetate film 1 and a hard coat layer on the back surface (i.e., the surface on the side where the alignment film and the optically anisotropic layer were not formed) of the cellulose acetate film 1.

Production of Optical Films of Example 16 and Comparative Examples 9 and 12

The optical films after formation of respective optically anisotropic layers in the production of optical films of Example 2 and Comparative Examples 1 and 2 were used as the optical films of Example 16 and Comparative Examples 9 and 12.

As described above, optical films of Example 16 and Comparative Examples 9 and 12 were produced so as to comprise an alignment film and an optically anisotropic layer on a surface of a cellulose acetate film 1, but did not have functional layers on the back surface of the cellulose acetate film 1.

Polarizing plates were produced with the optical films of Examples 14 to 16 and Comparative Examples 7 to 12 as in above. Picture display apparatuses were produced with the polarising plates as in above and were evaluated for minute interference unevenness as in above. The results are shown in Table 4.

TABLE 4

| | Basic Configuration | Surface Layer | | | Transparent Film | | | Alignment Film | |
|---|---|---|---|---|---|---|---|---|---|
| | | Ln layer *1 | Hn layer + Mn layer *6 | HC layer *2 | Material *3 | Refractive Index *4 | Thickness μm | Refractive Index *4 | Thickness nm |
| Comparative Example 7 | FIG. 4 | Present | Present | Present | CA | 1.48 | 80 | 1.53 | 700 |
| Comparative Example 8 | FIG. 4 | — | — | Present | CA | 1.48 | 80 | 1.53 | 700 |
| Comparative Example 9 | FIG. 4 | — | — | — | CA | 1.48 | 80 | 1.53 | 700 |
| Example 14 | FIG. 4 | Present | Present | Present | CA | 1.48 | 80 | 1.53 | 700 |
| Example 15 | FIG. 4 | — | — | Present | CA | 1.48 | 80 | 1.53 | 700 |
| Example 16 | FIG. 4 | — | — | — | CA | 1.48 | 80 | 1.53 | 700 |
| Comparative Example 10 | FIG. 4 | Present | Present | Present | CA | 1.48 | 80 | 1.53 | 700 |
| Comparative Example 11 | FIG. 4 | — | — | Present | CA | 1.48 | 80 | 1.53 | 700 |
| Comparative Example 12 | FIG. 4 | — | — | — | CA | 1.48 | 80 | 1.53 | 700 |

| | Optically Anisotropic Layer | | | | Optical Characteristics | | Evalution of Minute Unevenness in Interference |
|---|---|---|---|---|---|---|---|
| | Main Component *5 | Refractive Index *4 | Thickness nm | Optical Thickness nm | Re nm | Rth nm | |
| Comparative Example 7 | DLC | 1.6 | 1600 | 2560 | 125 | −3 | C |
| Comparative Example 8 | DLC | 1.6 | 1600 | 2580 | 125 | −3 | C |
| Comparative Example 9 | DLC | 1.6 | 1600 | 2560 | 125 | −3 | C |
| Example 14 | DLC | 1.6 | 1500 | 2400(N = 10) | 125 | −3 | A |
| Example 15 | DLC | 1.6 | 1500 | 2400(N = 10) | 125 | −3 | A |
| Example 16 | DLC | 1.6 | 1500 | 2400(N = 10) | 125 | −3 | A |
| Comparative Example 10 | DLC | 1.6 | 1420 | 2272 | 125 | −3 | C |
| Comparative Example 11 | DLC | 1.6 | 1420 | 2272 | 125 | −3 | C |
| Comparative Example 12 | DLC | 1.6 | 1420 | 2272 | 125 | −3 | C |

*1: Ln layer means low refractive index layer;
*2: HC layer means hard coat layer;
*3: CA means cellulose acetate;
*4: average in-plane refractive index is shown;
*5: DLC means discotic liquid crystal; and
*6: Hn layer and Mn layer respectively mean high refractive index layer and medium refractive index layer.

Production of Optical Film of Example 17

Production of Transparent Film (Cellulose Acetate Film T1)

The following composition was charged in a mixing tank and was stirred with heating to dissolve each component to prepare a cellulose acetate solution (dope A) having a solid concentration of 22% by mass,

| Composition of the cellulose acetate solution (dope A): | |
| --- | --- |
| Cellulose acetate having a degree of acetyl substitution of 2.86: | 100 parts by mass |
| Triphenyl phosphate (plasticizer): | 7.8 parts by mass |
| Biphenyl diphenyl phosphate (plasticizer): | 3.9 parts by mass |
| Ultraviolet absorber (Tinuvin 328, manufactured by Ciba Japan K.K.): | 0.9 parts by mass |
| Ultraviolet absorber (Tinuvin 326, manufactured by Ciba Japan K.K.): | 0.2 parts by mass |
| Methylene chloride (first solvent): | 336 parts by mass |
| Methanol (second solvent): | 29 parts by mass |
| 1-Butanol (third solvent): | 11 parts by mass |

Silica particles having an average particle size of 16 nm (AEROSIL R372, manufactured by Nippon Aerosil Co., Ltd.) were added to the dope A in an amount of 0.02 parts by mass based on 100 parts by mass of the cellulose acetate to prepare a dope B containing a matting agent. The dope B was prepared so as to have the same solvent composition as that of the dope A and a solid concentration of 19% by mass.

Flow casting with a band stretching machine was performed using the dope A as the main flow and the dope B containing the matting agent as the bottom layer and the top layer. The film surface temperature on the band was increased to 40° C., and then drying with warm air of 70° C. for 1 minute was performed. The film was peeled from the band and was dried with warm air of 140° C. for 10 minutes to produce a cellulose acetate film T1 having a residual solvent amount of 0.3% by mass. The flow rate was controlled such that the bottom layer and top layer containing the matting agent each had a thickness of 3 μm and the main flow had a thickness of 144 μm.

The resulting long cellulose acetate film T1 had a width of 2300 mm and a thickness of 150 μm. The in-plane retardation (Re) at a wavelength of 550 nm was 6 nm, and the retardation (Rth) in the thickness direction was 88 nm. The film T1 had an average in-plane refractive index of 1.48 and a thickness of 150 μm.

An optical film of Example 17 was produced as in Example 2 except that the cellulose acetate film T1 produced above was used in place of the cellulose acylate film "TD80UL" (manufactured by Fujifilm Corp.) in the process in Example 2.

Production of Optical Films of Examples 18 to 22

Production of Transparent Supports (Cellulose Acetate Films T2 to T4)

Cellulose acetate films T2 to T4 were produced as in the production of the cellulose acetate film T1 except that the thickness of each main flow was adjusted to 34 to 94 μm.

The resulting cellulose acetate films T2 to T4 had thicknesses of 40 to 100 μm. The in-plane retardation (Re) at a wavelength of 550 nm was 125 nm, and the retardation (Rth) in the thickness direction was 21 to 57 nm.

Production of Transparent Supports (Cellulose Acetate Films T5 and T6)

Cellulose acetate films T5 and T6 were produced as in cellulose acetate film T1 except that the cellulose acetate solution (dope A) was applied onto each glass plate with a die coater such that the thicknesses of cellulose acetate films T5 to T6 were 10 to 20 μm.

Optical films of Examples 18 to 22 were produced as in the optical film of Example 17 except that cellulose acetate films T2 to T6 were used in place of cellulose acetate film T1 in the production of the optical film of Example 17.

Production of Optical Films of Comparative Examples 13 to 18

Optical films of Comparative Examples 13 to 18 were produced as in the optical films of Examples 17 to 22 except that one thickness of each optically anisotropic layer containing a liquid crystal compound was adjusted to 1600 nm in the production of the optical films.

Production of Optical Films of Comparative Examples 19 to 24

Optical films of Comparative Examples 19 to 24 were produced as in the optical films of Examples 17 to 22 except that the thickness of each optically anisotropic layer containing a liquid crystal compound was adjusted to 1420 nm in the production of the optical films.

As described above, optical films of Examples 17 to 22 and Comparative Examples 13 to 24 having the same structure as that shown in FIG. 4 were produced so as to comprise an alignment film and an optically anisotropic layer on a surface of any of cellulose acetate films having different thicknesses and a hard coat layer and a low refractive index layer on the back surface of the cellulose acetate film.

Polarising plates were produced with the optical films of Examples 17 to 22 and Comparative Examples 13 to 24 as in above. Picture display apparatuses were produced with the polarizing plates as in above and were evaluated for minute interference unevenness as in above. The results are shown in Table 5.

TABLE 5

| | | Surface Layer | | Transparent Film | | | Alignment Film | |
| --- | --- | --- | --- | --- | --- | --- | --- | --- |
| | Basic Configuration | Ln layer *1 | HC layer *2 | Material *3 | Refractive Index *4 | Thickness μm | Refractive Index *4 | Thickness nm |
| Comparative Example 13 | FIG. 4 | Present | Present | CA | 1.48 | 150 | 1.53 | 700 |
| Comparative Example 14 | FIG. 4 | Present | Present | CA | 1.48 | 100 | 1.53 | 700 |
| Comparative Example 15 | FIG. 4 | Present | Present | CA | 1.48 | 60 | 1.53 | 700 |
| Comparative Example 16 | FIG. 4 | Present | Present | CA | 1.48 | 40 | 1.53 | 700 |

TABLE 5-continued

| | | | | | | | | |
|---|---|---|---|---|---|---|---|---|
| Comparative Example 17 | FIG. 4 | Present | Present | CA | 1.48 | 20 | 1.53 | 700 |
| Comparative Example 18 | FIG. 4 | Present | Present | CA | 1.48 | 10 | 1.53 | 700 |
| Example 17 | FIG. 4 | Present | Present | CA | 1.48 | 150 | 1.53 | 700 |
| Example 18 | FIG. 4 | Present | Present | CA | 1.48 | 100 | 1.53 | 700 |
| Example 19 | FIG. 4 | Present | Present | CA | 1.48 | 60 | 1.53 | 700 |
| Example 20 | FIG. 4 | Present | Present | CA | 1.48 | 40 | 1.53 | 700 |
| Example 21 | FIG. 4 | Present | Present | CA | 1.48 | 20 | 1.53 | 700 |
| Example 22 | FIG. 4 | Present | Present | CA | 1.48 | 10 | 1.53 | 700 |
| Comparative Example 19 | FIG. 4 | Present | Present | CA | 1.48 | 150 | 1.53 | 700 |
| Comparative Example 20 | FIG. 4 | Present | Present | CA | 1.48 | 100 | 1.53 | 700 |
| Comparative Example 21 | FIG. 4 | Present | Present | CA | 1.48 | 60 | 1.53 | 700 |
| Comparative Example 22 | FIG. 4 | Present | Present | CA | 1.48 | 40 | 1.53 | 700 |
| Comparative Example 23 | FIG. 4 | Present | Present | CA | 1.48 | 20 | 1.53 | 700 |
| Comparative Example 24 | FIG. 4 | Present | Present | CA | 1.48 | 10 | 1.53 | 700 |

| | Optically Anisotropic Layer | | | | Optical Characteristics | | Evaluation of Minute Unevenness in Interference |
|---|---|---|---|---|---|---|---|
| | Main Component *5 | Refractive Index *4 | Thickness nm | Optical Thickness nm | Re nm | Rth nm | Interference in Interference |
| Comparative Example 13 | DLC | 1.6 | 1600 | 2560 | 125 | 40 | C |
| Comparative Example 14 | DLC | 1.6 | 1600 | 2560 | 125 | 10 | C |
| Comparative Example 15 | DLC | 1.6 | 1600 | 2560 | 125 | −15 | C |
| Comparative Example 16 | DLC | 1.6 | 1600 | 2560 | 125 | −27 | C |
| Comparative Example 17 | DLC | 1.6 | 1600 | 2560 | 125 | −39 | C |
| Comparative Example 18 | DLC | 1.6 | 1600 | 2560 | 125 | −45 | C |
| Example 17 | DLC | 1.6 | 1500 | 2400(N = 10) | 125 | 40 | A |
| Example 18 | DLC | 1.6 | 1500 | 2400(N = 10) | 125 | 10 | A |
| Example 19 | DLC | 1.6 | 1500 | 2400(N = 10) | 125 | −15 | A |
| Example 20 | DLC | 1.6 | 1500 | 2400(N = 10) | 125 | −27 | A |
| Example 21 | DLC | 1.6 | 1500 | 2400(N = 10) | 125 | −39 | A |
| Example 22 | DLC | 1.6 | 1500 | 2400(N = 10) | 125 | −45 | A |
| Comparative Example 19 | DLC | 1.6 | 1420 | 2272 | 125 | 40 | C |
| Comparative Example 20 | DLC | 1.6 | 1420 | 2272 | 125 | 10 | C |
| Comparative Example 21 | DLC | 1.6 | 1420 | 2272 | 125 | −15 | C |
| Comparative Example 22 | DLC | 1.6 | 1420 | 2272 | 125 | −27 | C |
| Comparative Example 23 | DLC | 1.6 | 1420 | 2272 | 125 | −39 | C |
| Comparative Example 24 | DLC | 1.6 | 1420 | 2272 | 125 | −45 | C |

*1: Ln layer means low refractive index layer;
*2: HC layer means hard coat layer;
*3: CA means cellulose acetate;
*4: average in-plane refractive index is shown; and
*5: DLC means discotic liquid crystal.

Production of Optical Film of Example 23

As in Comparative Example 1, a cellulose acetate film 1 was prepared by saponifying a commercially available cellulose acylate film "TDSOUL" (manufactured by Fujifilm Corp.).

The application liquid for alignment film having the following composition was applied to a surface of the cellulose acetate film 1 with a wire bar coater so as to have a thickness of 700 nm. Drying with warm air of 60° C. for 60 seconds and further with warm air of 100° C. for 120 seconds was performed to form a film. Subsequently, the resulting film was subjected to rubbing treatment in the direction of 45° with respect to the longitudinal, direction to form an alignment film.

Composition of the application liquid for alignment film:

| | |
|---|---|
| Modified polyvinyl alcohol shown below: | 10 parts by mass |
| Water: | 371 parts by mass |
| Methanol: | 119 parts by mass |
| Glutaraldehyde: | 0.5 parts by mass |

[Modified polyvinyl alcohol]

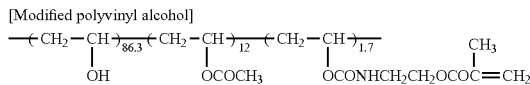

An application liquid for optically anisotropic layer having the following composition was applied to the rubbing treated surface of the alignment film with a wire bar.

Composition of the application liquid for optically anisotropic layer:

| | |
|---|---|
| Rod-like liquid crystal compound shown below: | 1.8 g |
| Ethylene oxide-modified trimethylolpropane triacrylate (V#360, manufactured by Osaka Organic Chemical Industry Ltd.): | 0.2 g |
| Photopolymerization initiator (Irgacure 907, manufactured Ciba-Geigy Co.): | 0.06 g |
| Sensitizer (Kayacure DETX, manufactured by Nippon Kayaku Co., Ltd): | 0.02 g |
| Methyl ethyl ketone: | 3.9 g |

[Rod-like liquid crystal compound]

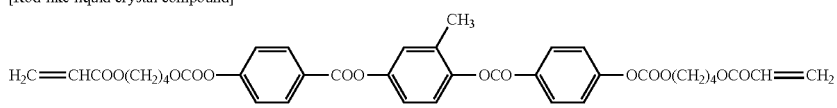

The coated film was heated in a thermostat bath of 125° C. for 3 minutes to align the rod-like liquid crystal compound. Subsequently, the film was irradiated with UV light for 30 seconds with a 120 W/cm high-pressure mercury lamp to crosslink the rod-like liquid crystal compound molecules. After UV curing at 80° C., the temperature was decreased to room temperature. Thus, an optically anisotropic layer was formed. The optically anisotropic layer had a thickness of 1.81 µm and an average in-plane refractive index of 1.55. The conditions of the resulting optically anisotropic: layer were investigated to confirm that application ununiformity (ununiformity caused by repelling of the application liquid by the alignment film) and disorder of alignment did not occur.

The film showed a be (550) of 125 nm and an Rth(550) of 95 nm at a wavelength of 550 nm.

Subsequently, an optical film, for Example 23 having the same structure as that shown in FIG. 4 was produced by forming a hard coat layer and a low refractive index layer on the back surface (i.e., the surface on the side where the alignment film and the optically anisotropic layer were not formed) of the cellulose acetate film 1 as in Comparative Example 1.

Production of Optical Films of Comparative Examples 25 and 26

Optical films of Comparative Examples 25 and 26 were produced as in the production of the optical film of Example 23 except that the application liquids and the application conditions were changed such that the optically anisotropic layer containing a liquid crystal compound had a thickness of 1.76 µm or 1.71 µm and showed an Re(550) of 125 nm at a wavelength of 550 nm.

Subsequently, optical films for Comparative Examples 25 and 26 having the same structure as that shown in FIG. 4 were produced by forming a hard coat layer and a low refractive index layer on the back surface (i.e., the surface on the side where the alignment film and the optically anisotropic layer were not formed) of each cellulose acetate film 1 as in Comparative Example 1.

Polarising plates were produced with the optical films of Example 23 and Comparative Examples 25 and 26 as in above. Picture display apparatuses were produced with the polarizing plates as in above and were evaluated for minute interference unevenness as in above. The results are shown in Table 6.

TABLE 6

| | Basic Configuration | Surface Layer | | Transparent Film | | | Alignment Film | |
|---|---|---|---|---|---|---|---|---|
| | | Ln layer *1 | HC layer *2 | Material *3 | Refractive Index *4 | Thickness µm | Refractive Index *4 | Thickness nm |
| Comparative Example 25 | FIG. 4 | Present | Present | CA | 1.48 | 80 | 1.53 | 700 |
| Example 23 | FIG. 4 | Present | Present | CA | 1.48 | 80 | 1.53 | 700 |
| Comparative Example 26 | FIG. 4 | Present | Present | CA | 1.48 | 80 | 1.53 | 700 |

| | Optically Anisotropic Layer | | | | Optical Characteristics | | Evaluation of Minute |
|---|---|---|---|---|---|---|---|
| | Main Component *5 | Refractive Index *4 | Thickness nm | Optical Thickness nm | Re nm | Rth nm | Unevenness in Interference |
| Comparative Example 25 | RLC | 1.55 | 1810 | 2808 | 125 | 95 | C |

TABLE 6-continued

| | | | | | | | |
|---|---|---|---|---|---|---|---|
| Example 23 | RLC | 1.55 | 1760 | 2728(N = 11) | 125 | 95 | A |
| Comparative Example 26 | RLC | 1.55 | 1720 | 2666 | 125 | 95 | C |

*1: Ln layer means low refractive index layer;
*2: HC layer means hard coat layer;
*3: CA means cellulose acetate;
*4: average in-plane refractive index is shown; and
*5: RLC means rod-like liquid crystal.

Production of Optical Film of Example 24

Formation of Adhesive Agent Layer A

An acrylate polymer was prepared by the following procedure.

A reaction container equipped with a cooling tube, a nitrogen gas inlet tube, a thermometer, and a stirrer was charged with 100 parts by mass of butyl acrylate, 3 parts by mass of acrylic acid, 0.3 parts by mass of 2,2'-azobisisobutyronitrile, and ethyl acetate such that, the solid concentration was 30%. The mixture was subjected to a reaction under a nitrogen gas flow at 60° C. for 4 hours to yield an acrylate polymer solution. An acrylate polymer having an average in-plane refractive index of 1.53 was prepared by the same procedure using butyl acrylate, acrylic acid, or benzyl acrylate.

An adhesive agent layer A was produced using the resulting acrylate polymer by the following procedure.

Two parts of trimethylolpropane tolylene diisocyanate (Coronate L, manufactured by Nippon Polyurethane Industry Co., Ltd.) and 0.1 parts of 3-glycidoxypropyltrimethoxysilane based on 100 parts of the solid content of the acrylate polymer were added to the acrylate polymer. The resulting mixture was applied to a separate film surface treated with a silicone release agent with a die coater, followed by drying at 150° C. for 3 hours to yield an adhesive agent layer A having a thickness of 20 μm.

Formation of Hard Coat Layer and Low Refractive Index Layer

The application liquid for hard coat layer used in the production of the optical film of Comparative Example 1 was applied onto a glass plate with a die coater (solid content applied; 12 g/m$^2$). After drying at 100° C. for 60 seconds, the application layer was cured by irradiation with ultraviolet light at an illuminance of 400 mW/cm$^2$ and a dose of 150 mJ/cm$^2$ with a 160 W/cm air cooling metal halide lamp (manufactured by Eye Graphics Co., Ltd.) under nitrogen purging to provide an atmosphere of an oxygen concentration of 0.1 vol % to prepare a glass plate provided with a hard coat layer (antireflection layer). The application liquid for low refractive index layer used in the production of the optical film of Comparative Example 1 was applied onto the resulting hard coat layer. The low refractive index layer was dried at 70° C. for 60 seconds and was cured by ultraviolet light irradiation at an illuminance of 600 mW/cm$^2$ and a dose of 300 mJ/cm$^2$ with a 240 W/cm air cooling metal halide lamp (manufactured by Eye Graphics Co., Ltd.) under nitrogen purging to provide an atmosphere of an oxygen concentration of 0.1 vol %. The low refractive index layer had a refractive index of 1.34 and a thickness of 95 nm. Thus, a glass plate on which the hard coat layer and the low refractive index layer were laminated in this order was produced.

Formation of Alignment Film, and Optically Anisotropic Layer

An alignment film was formed on a glass substrate in accordance with the description of Japanese Patent Laid-Open No. 2002-98828 such that the alignment film had a refractive index of 1.53 and a thickness of 700 nm. Subsequently, an optically anisotropic layer was formed on the alignment film as in the production of the optical film of Example 2.

The hard coat layer and the low refractive index layer formed on the glass plate were peeled from the glass plate and were pasted to a commercially available norbornene polymer film (cyclic olefin polymer; "ZEONOR ZF14" (manufactured by Optes Inc.) with the adhesive agent A. The alignment film, and the optically anisotropic layer formed on the glass plate were peeled from the glass plate and were pasted to the surface of the norbornene polymer film on the side where the hard coat layer and the low refractive index layer were not pasted with the adhesive agent A to produce an optical film of Example 24.

The optical film of Example 24 had a layer structure composed of low refractive index layer/hard coat layer/adhesive agent layer/norbornene polymer film (transparent film)/adhesive agent layer/alignment film/phase difference layer.

Production of Optical Film of Comparative Example 27

An optical film of Comparative Example 27 was produced as in the optical film of Example 24 except that the thickness of the optically anisotropic layer containing a liquid crystal compound was adjusted to 1.6 μm by controlling the application conditions.

Production of Optical Film of Comparative Example 28

An optical film of Comparative Example 28 was produced as in the optical film of Example 24 except that the thickness of the optically anisotropic layer containing a liquid crystal compound was adjusted to 1.42 μm by controlling the application conditions.

Polarising plates were produced with the optical films of Example 24 and Comparative Examples 27 and 28 as in above. Picture display apparatuses were produced with the polarising plates as in above and were evaluated for minute interference unevenness as in above. The results are shown in Table 7,

TABLE 7

| | Basic Configuration | Surface Layer | | Transparent Film | | | Pasting Layer | | Alignment Film | |
|---|---|---|---|---|---|---|---|---|---|---|
| | | Ln layer *1 | HC layer *2 | Material *3 | Refractive Index *4 | Thickness μm | Refractive Index *4 | Thickness μm | Refractive Index *4 | Thickness nm |
| Comparative Example 27 | *6 | Present | Present | COP | 1.53 | 100 | 1.53 | 40 | 1.53 | 700 |
| Example 24 | *6 | Present | Present | COP | 1.53 | 100 | 1.53 | 40 | 1.53 | 700 |
| Comparative Example 28 | *6 | Present | Present | COP | 1.53 | 100 | 1.53 | 40 | 1.53 | 700 |

| | | Optically Anisotropic Layer | | | | Optical Characteristics | | Evaluation of Minute Unevenness in Interference |
|---|---|---|---|---|---|---|---|---|
| | | Main Component *5 | Refractive Index *4 | Thickness nm | Optical Thickness nm | Re nm | Rth nm | |
| | Comparative Example 27 | DLC | 1.6 | 1800 | 2560 | 125 | −50 | C |
| | Example 24 | DLC | 1.6 | 1500 | 2400 (N = 10) | 125 | −50 | A |
| | Comparative Example 28 | DLC | 1.6 | 1420 | 2272 | 125 | −50 | C |

*1: Ln layer means low refractive index layer;
*2: HC layer means hard coat layer;
*3: COP means cyclic olefin polymer;
*4: average in-plane refractive index is shown;
*5: DLC means discotic liquid crystal, and
*6: a structure composed of low refractive index layer/hard coat layer/adhesive agent layer/cyclic olefin polymer film (transparent film)/adhesive agent layer/alignment film/phase difference layer.

Production of Optical Film of Example 25

An optical film of Example 25 was produced, as in the optical film of Example 2 except that the alignment film was formed in accordance with the description of Japanese Patent Laid-Open No. 2002-98828 such that the alignment film had a refractive index of 1.57 and a thickness of 700 nm.

Production of Optical Film of Example 26

An optical film of Example 26 was produced as in the optical film of Example 2 except that the alignment film was formed in accordance with the description of Japanese Patent Laid-Open. No. 2002-98828 such that the alignment film had a refractive index of 1.58 and a thickness of 700 nm.

Production of Optical Film of Comparative Example 29

An optical film of Comparative Example 29 was produced as in the optical film of Example 2 except that the alignment film was formed in accordance with the description of Japanese Patent Laid-Open No. 2002-98828 such that the alignment film had a refractive index of 1.59 and a thickness of 700 nm.

As described above, optical films of Examples 25 and 26 and Comparative Example 29 having the same structure as that shown in FIG. 4 were produced. The optical films each comprised any of alignment films having different thicknesses and an optically anisotropic layer on a surface of the cellulose acetate film 1 and a hard coat layer and a low refractive index layer on the back surface of the cellulose acetate film 1.

Polarizing plates were produced with the optical films of Examples 25 and 26 and Comparative Example 29 as in above. Picture display apparatuses were produced with the polarising plates as in above and were evaluated for minute interference unevenness as in above. The results are shown, in Table 8.

TABLE 8

| | Basic Configuration | Surface Layer | | Transparent Film | | | Alignment Film | |
|---|---|---|---|---|---|---|---|---|
| | | Ln layer *1 | HC layer *2 | Material *3 | Refractive Index *4 | Thickness μm | Refractive Index *4 | Thicknes nm |
| Example 25 | FIG. 4 | Present | Present | CA | 1.48 | 80 | 1.57 | 700 |
| Example 26 | FIG. 4 | Present | Present | CA | 1.48 | 80 | 1.58 | 700 |
| Comparative Example 29 | FIG. 4 | Present | Present | CA | 1.48 | 80 | 1.59 | 700 |

TABLE 8-continued

| | Optically Anisotropic Layer | | | | Optical Characteristics | | Evaluation of Minute |
|---|---|---|---|---|---|---|---|
| | Main Component *5 | Refractive Index *4 | Thickness nm | Optical Thickness nm | Re nm | Rth nm | Unevenness in Interference |
| Example 25 | DLC | 1.6 | 1500 | 2400(N = 10) | 125 | 95 | A |
| Example 26 | DLC | 1.6 | 1500 | 2400(N = 10) | 125 | 95 | B |
| Comparative Example 29 | DLC | 1.6 | 1500 | 2400(N = 10) | 125 | 95 | C |

*1: Ln layer means low refractive index layer;
*2: HC layer means hard coat layer;
*3: CA means cellulose acetate;
*4: average in-plane refractive index is shown; and
*5: DLC means discotic liquid crystal.

Production of Optical Film of Example 27

An optical film of Example 27 was produced as in Example 23 except that the following rod-like liquid crystal A was used as the rod-like liquid crystal for the optionally anisotropic layer and that the application amount of the application liquid for optionally anisotropic layer and the temperature for fixing the alignment state were adjusted such that the optically anisotropic layer had a thickness of 0.9 μm and showed an Re(550) of 125 nm and an Rth(550) of 95 nm at 550 nm. The optically anisotropic layer had an optical thickness of 1395 nm.

and showed an Re(550) of 125 nm and an Rth(550) of 95 nm at 550 nm. The optically anisotropic layer had an optical thickness of 1240 nm.

Production of Optical Film of Comparative Example 31

An optical film of Comparative Example 31 was produced as in Example 27 except that the application amount of the application liquid for optionally anisotropic layer and the temperature for fixing the alignment state were adjusted such that the optically anisotropic layer had a thickness of 1.0 μm

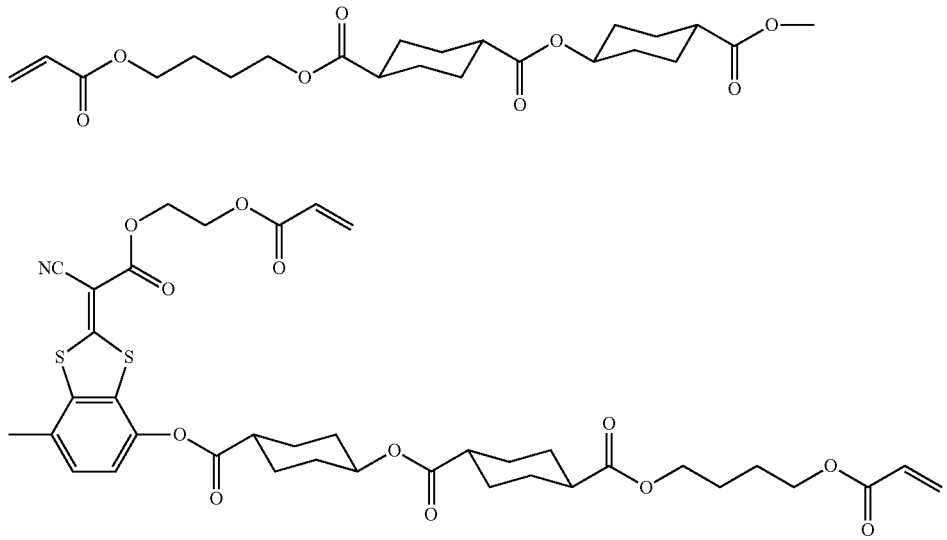

Rod-like liquid crystal A

Production of Optical Film of Comparative Example 30

An optical film of Comparative Example 30 was produced as in Example 27 except that the application amount of the application liquid for optionally anisotropic layer and the temperature for fixing the alignment state were adjusted such that the optically anisotropic layer had a thickness of 0.8 μm and showed an Re(550) of 125 nm and an Rth(550) of 95 nm at 550 nm. The optically anisotropic layer had an optical thickness of 1550 nm.

Polarizing plates were produced using the optical films of Example and Comparative Examples as in above. Picture display apparatuses were produced with the polarising plates as in above and were evaluated for minute unevenness in interference as in above. The results are shown in the following Table.

TABLE 9

| Basic Configuration | Surface layer | | Transparent Film | | | Alignment Film | |
|---|---|---|---|---|---|---|---|
| | Ln layer *1 | HC layer *2 | Material *3 | Refractive Index *4 | Thicknes μm | Refractive Index *4 | Thicknes nm |
| Example 27 FIG. 4 | Present | Present | CA | 1.48 | 80 | 1.53 | 700 |
| Comparative Example 30 FIG. 4 | Present | Present | CA | 1.48 | 80 | 1.53 | 700 |
| Comparative Example 31 FIG. 4 | Present | Present | CA | 1.48 | 80 | 1.63 | 700 |

| | Optically Anisotropic Layer | | | | Optical Characteristics | | Evalution of Minute |
|---|---|---|---|---|---|---|---|
| | Main Component *5 | Refractive Index *4 | Thicknes nm | Optical Thickness nm | Re nm | Rth nm | Unevenness in Interference |
| Example 27 | RLC | 1.55 | 900 | 1395(N = 6) | 125 | 95 | A |
| Comparative Example 30 | RLC | 1.55 | 800 | 1240 | 125 | 95 | C |
| Comparative Example 31 | RLC | 1.55 | 1000 | 1550 | 125 | 95 | C |

*1: Ln layer means low refractive index layer;
*2: HC layer means hard coat layer;
*3: CA means cellulose acetate;
*4: average in-plane refractive index is shown; and
*5: RLC means rod-like liquid crystal.

Production of Optical Film of Example 28

Production of Transparent Film
Alkali Saponification

Alkali saponification was performed as in Comparative Example 1 except that a cellulose acetate film "TD60" (manufactured by Fujifilm Corp.) was used. The cellulose acetate film TD60 had an average refractive index of 1.48 and a thickness of 60 μm.

Formation of Alignment Film (Second Layer)

The composition shown below for rubbing alignment film was prepared and was then filtered through a polypropylene filter having a pore size of 0.2 μm to prepare an application liquid for rubbing alignment film. The application liquid was applied to the saponified cellulose acetate film with a wire bar #14, followed by drying at 100° C. for 1 minute. The resulting coated film was irradiated with UV light for 2 seconds using an air cooling metal halide lamp (manufactured by Eye Graphics Co., Ltd.) providing an illuminance of 50 mW/cm² at 365 nm under the air through a stripe mask having a transparent portion with a lateral stripe width of 285 μm and a shielding portion with a lateral stripe width of 285 μm to decompose the photo—acid-generating agent and generate an acidic compound to form an alignment layer for a first phase difference region. On this occasion, the mask was set such, that the stripe direction of the mask was parallel to the conveying direction. Subsequently, rubbing treatment was performed at 500 rpm in one direction with an angle of 45° with respect to the conveying direction to provide a rubbing alignment film to the cellulose acetate film. The alignment film had a thickness of 0.7 μm and an average refractive index of 1.53.

Composition of application liquid for alignment film:

| | |
|---|---|
| Polymer material for alignment film (PVA103, polyvinyl alcohol manufactured by Kuraray Co., Ltd.): | 2.4 parts by mass |

-continued

Composition of application liquid for alignment film:

| | |
|---|---|
| Photo-acid-generating agent (S-4): | 0.11 parts by mass |
| Methanol: | 16.7 parts by mass |
| Isopropanol: | 7.4 parts by mass |
| Water: | 73.4 parts by mass |

Photo-acid-generating agent (S-4)

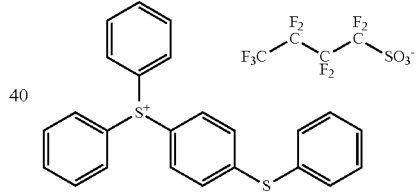

Formation of Patterned Optically Anisotropic Layer (First Layer) Containing Discotic Liquid Crystal Compound The composition shown below for optically anisotropic layer was prepared and was then filtered through a polypropylene filter having a pore size of 0.2 μm to prepare an application liquid for optically anisotropic layer. After application of the application liquid, drying at a surface temperature of 115° C. for 1 minute and then at 100° C. for 1 minute was performed. The resulting coated film was cooled to 80° C. and irradiated wish UV light for 20 seconds using an air cooling metal halide lamp (manufactured by Eye Graphics Co., Ltd.) providing an illuminance of 50 mW/cm² at 365 nm under the air to fix the alignment state to form a patterned optically anisotropic layer for phase difference region. In the mask exposure portion (first phase difference region), the discotic liquid crystals were perpendicularly aligned such that the slow axis direction was parallel to the rubbing direction. In the non-exposure portion (second phase difference region), one discotic liquid crystals were perpendicularly aligned such that the slow axis direction was orthogonal to the rubbing direction. The optically anisotropic layer had a thickness of 1.2 μm, an average refractive index of 1.6, and an optical thickness of 1920 nm.

Composition of application liquid for optically anistropic layer:

| | |
|---|---|
| Discotic liquid crystal E-2: | 87 parts by mass |
| Alignment film interface alignment agent (II-3): | 0.43 parts by mass |
| Alignment film interface alignment agent (II-4): | 0.08 parts by mass |
| Air interface alignment agent (P-3): | 0.17 parts by mass |
| Air interface alignment agent (P-4): | 0.17 parts by mass |
| Photopolymerization initiator (Irgacure 907, manufactured by by Ciba Specialty Chemicals Corp.): | 3.0 parts by mass |
| Sensitizer (Kayacure DETX, manufactured by Nippon Kayaku Co., Ltd): | 1 part by mass |
| Ethylene oxide-modified trimethylolpropane triacrylate (V#360, manufactured by Osaka Organic Chemical Industry Ltd.): | 8.7 parts by mass |
| Methyl ethyl ketone: | 400 parts by mass |

Discotic liquid crystal E-2

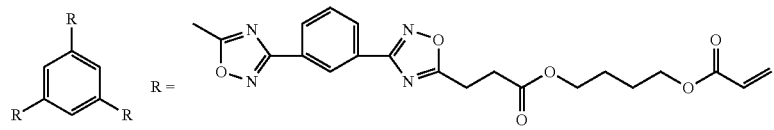

Alignment film interface alignment agent (II-3)

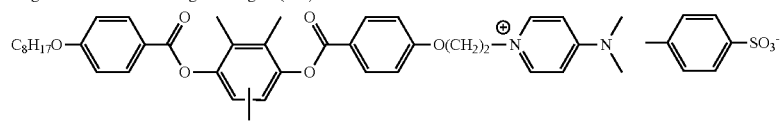

Alignment film interface alignment agent (II-4)

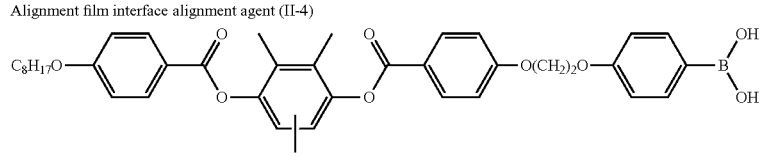

Air interface alignment agent (P-3)

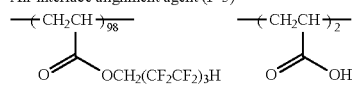

Mw. 13000

Air interface alignment agent (P-4)

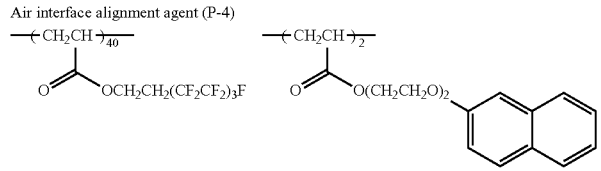

Mw. 13000

The resulting optical film showed an Re(550) of 125 nm and an Rth(550) of 0 nm at 550 nm.

Formation of Hard Coat Layer and Low Refractive Index Layer

A hard, coat layer and a low refractive index layer were formed as in Comparative Example 1 to produce an optical film for Example 26 having the same structure as that shown in FIG. 4.

Production of Optical Film of Comparative Example 32

An optical film of Comparative Example 32 was produced as in Example 28 except that the application amount of the application liquid for optionally anisotropic layer and the temperature for fixing the alignment state were adjusted such that the patterned, optically anisotropic layer had a thickness of 1.1 μm and showed, an Re(550) of 125 nm and an Rth(550) of 0 nm at 550 nm. The optically anisotropic layer had an optical thickness of 1760 nm.

Production of Optical Film of Comparative Example 33

An optical film of Comparative Example 33 was produced as in Example 28 except that the application amount of the application liquid for optionally anisotropic layer and the temperature for fixing the alignment state were adjusted such that the patterned optically anisotropic layer had a thickness of 1.25 μm and showed an Re(550) of 125 nm and an Rth(550) of 0 nm at 550 nm. The optically anisotropic layer had an optical thickness of 2000 nm.

Production of Optical Film Example 29

Production of Transparent Film
Alkali Saponification
Alkali saponification was performed as in Example 27 except that a cellulose acetate film showing an Re(550) of 0 nm and an Rth(550) of −63 nm at 550 nm was used. The cellulose acetate film 28 had an average refractive index of 1.48 and a thickness of 60 μm.
Formation of Alignment Film (Second Layer)
A solution of 10% polyvinyl cinnamate (manufactured by Sigma-Aldrich Corp.) in a methyl ethyl ketone-methanol mixture was applied to the saponified surface of the cellulose acetate film produced in Example 28, followed by drying at 100° C. for 1 minute. The resulting film had a thickness of 0.7 µm and an average refractive index of 1.53. The resulting film was subjected to rubbing treatment in the direction of 45° with respect to the film-conveying direction. Subsequently, a stripe mask was arranged on the film in such a manner that the stripe was parallel to the conveying direction, and UV light irradiation was performed, with an air cooling metal halide lamp (manufactured by Eye Graphics Co., Ltd.) of 160 W/cm² under the air. On this occasion, the stripe mask having a transparent portion with, a stripe width of 285 µm and a shielding portion with a stripe width of 285 µm was used for forming a patterned alignment layer. The distance between the exposure mask surface and the film was set to be 200 µm. In the UV-A region (integration of a wavelength range of 320 to 380 nm), UV light having an illuminance of 100 mW/cm² was used at a dose of 1000 mJ/cm².

Formation of Patterned Optically Anisotropic Layer (First Layer) Containing Rod-like Liquid Crystal Compound The composition shown below for optically anisotropic layer was prepared and was then filtered through a polypropylene filter having a pore size of 0.2 µm to prepare an application liquid. The application liquid was applied onto the cellulose acetate film provided with an alignment film and was dried at a surface temperature of 105° C. for 2 minutes to form a liquid crystal phase state. After cooling to 75° C., the alignment state was fixed by irradiation with UV light, with an air cooling metal halide lamp (manufactured by Eye Graphics Co., Ltd.) of 160 W/cm² under the air to produce a patterned optically anisotropic layer. The optically anisotropic layer had a thickness of 0.9 µm, an average refractive index of 1.55, and an optical thickness of 1395 nm.

Composition of application liquid for optically anisotropic layer:

| | |
|---|---|
| Rod-like liquid crystal (LC242, manufactured by BASF Corp.): | 100 parts by mass |
| Horizontal alignment agent A: | 0.3 parts by mass |
| Photopolymerization initiator (Irgacure 907, manufactured by Ciba Specialty Chemicals Corp.): | 3.3 parts by mass |
| Sensitizer (Kayacure DETX, manufactured by Nippon Kayaku Co., Ltd.): | 1.1 parts by mass |
| Methyl ethyl ketone: | 300 parts by mass |

Rod-like liquid crystal (LC242 disclosed by WO2010/090429A2)

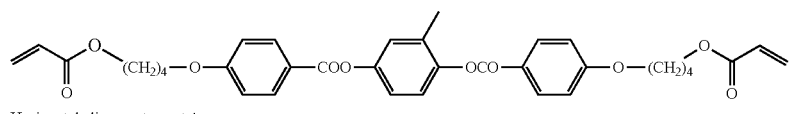

Horizontal alignment agent A

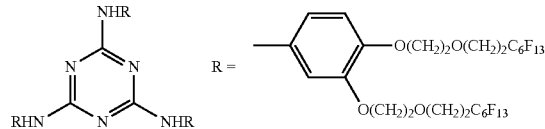

The resulting optical film showed an Re(550) of 125 nm and an Rth(550) of 0 nm at 550 nm.

Formation of Hard Coat Layer and Low Refractive Index Layer

A hard coat layer and a low refractive index layer were formed as in Comparative Example 1 to produce an optical film for Example 29 having the same structure as that shown in FIG. 4.

Production of Optical Film of Comparative Example 34

An optical film of Comparative Example 34 was produced as in Example 28 except that the application amount of the application liquid for optionally anisotropic layer and the temperature for fixing the alignment state were adjusted such that the patterned optically anisotropic layer had a thickness of 0.8 µm and showed an Re(550) of 125 nm and an Rth(550) of 0 nm at 550 nm. The optically anisotropic layer had an optical thickness of 1240 nm.

Production of Optical Film of Comparative Example 35

An optical film of Comparative Example 35 was produced as in Example 28 except that the application amount of the application liquid for optionally anisotropic layer and the temperature for fixing the alignment state were adjusted such that the patterned optically anisotropic layer had a thickness of 1.0 µm and showed an Re(550) of 125 nm and an Rth(550) of 0 nm at 550 nm. The optically anisotropic layer had an optical thickness of 1550 nm.

Production of Optical Film of Example 30

An optical film of Example 30 was produced as in Example 28 except that the following rod-like liquid crystal A was used as the rod-like liquid crystal for the patterned optionally anisotropic layer and that the application amount of the application liquid for optionally anisotropic layer and the temperature for fixing the alignment state were adjusted such that the patterned optically anisotropic layer had a thickness of 0.9 µm and showed an Re(550) of 125 nm and an Rth(550) of 0 nm at 550 nm. The optically anisotropic layer had an optical thickness of 1395 nm.

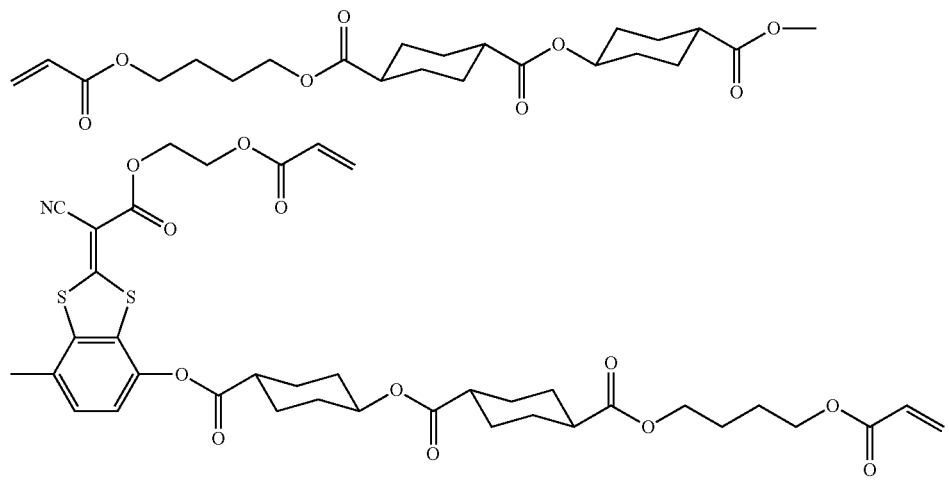

Rod-like liquid crystal A

Production of Optical Film of Comparative Example 36

An optical film of Comparative Example 36 was produced as in Example 28 except that the application amount of the application liquid for optionally anisotropic layer and the temperature for fixing the alignment state were adjusted such that the patterned optically anisotropic layer had a thickness of 0.8 µm and showed an Re(550) of 125 nm and an Rth(550) of 0 nm at 550 nm. The optically anisotropic layer had an optical thickness of 1240 nm.

Production of Optical Film of Comparative Example 37

An optical film of Comparative Example 37 was produced as in Example 28 except that the application amount of the application liquid for optionally anisotropic layer and the temperature for fixing the alignment state were adjusted such that the patterned optically anisotropic layer had a thickness of 1.0 µm and shoved an Re(550) of 125 nm and an Rth(550) of 0 nm at 550 nm. The optically anisotropic layer had an optical thickness of 1550 nm.

Polarising plates were produced using the optical films of these Examples and Comparative Examples as in above.

Evaluation of Mounting on Liquid Crystal Display Apparatus

The patterned phase difference plate and the front polarizing plate were removed from a 3D monitor (manufactured by ZALMA) of a circular polarized glass system, and any of the polarizing plates produced above was pasted instead.

As image for stereo picture was projected on the resulting 3D monitor and was observed through circular polarized glasses for the right and left eyes to confirm a clear stereo picture without crosstalk.

Minute unevenness in interference was evaluated using the resulting picture display apparatuses as in above. The results are shown in the following Table.

TABLE 10

| | | Surface layer | | Transparent Film | | | Alignment Film | |
|---|---|---|---|---|---|---|---|---|
| | Basic Configuration | Ln layer *1 | HC layer *2 | Material *3 | Refractive Index *4 | Thickness µm | Refractive Index *4 | Thickness nm |
| Example 28 | FIG. 4 | Present | Present | CA | 1.48 | 60 | 1.53 | 700 |
| Comparative Example 32 | FIG. 4 | Present | Present | CA | 1.48 | 60 | 1.53 | 700 |
| Comparative Example 33 | FIG. 4 | Present | Present | CA | 1.48 | 60 | 1.53 | 700 |
| Example 29 | FIG. 4 | Present | Present | CA | 1.48 | 60 | 1.53 | 700 |
| Comparative Example 34 | FIG. 4 | Present | Present | CA | 1.48 | 60 | 1.53 | 700 |
| Comparative Example 35 | FIG. 4 | Present | Present | CA | 1.48 | 60 | 1.53 | 700 |
| Example 30 | FIG. 4 | Present | Present | CA | 1.48 | 60 | 1.53 | 700 |
| Comparative Example 36 | FIG. 4 | Present | Present | CA | 1.48 | 60 | 1.53 | 700 |
| Comparative Example 37 | FIG. 4 | Present | Present | CA | 1.48 | 60 | 1.53 | 700 |

TABLE 10-continued

| | Optically Anisotropic Layer | | | | Optical Characteristics | | Evalution of Minute Unevenness in |
|---|---|---|---|---|---|---|---|
| | Main Component *5 | Refractive Index *4 | Thickness nm | Optical Thickness nm | Re nm | Rth nm | Interference in Interference |
| Example 28 | DLC | 1.6 | 1200 | 1920(N = 8) | 125 | 0 | A |
| Comparative Example 32 | DLC | 1.6 | 1100 | 1760 | 125 | 0 | C |
| Comparative Example 33 | DLC | 1.6 | 1250 | 2000 | 125 | 0 | C |
| Example 29 | RLC | 1.55 | 900 | 1395(N = 6) | 125 | 0 | A |
| Comparative Example 34 | RLC | 1.56 | 800 | 1240 | 125 | 0 | C |
| Comparative Example 35 | RLC | 1.55 | 1000 | 1550 | 125 | 0 | C |
| Example 30 | RLC | 1.55 | 900 | 1395(N = 6) | 125 | 0 | A |
| Comparative Example 36 | RLC | 1.55 | 800 | 1240 | 125 | 0 | C |
| Comparative Example 37 | RLC | 1.56 | 1000 | 1650 | 125 | 0 | C |

*1: Ln layer means low refractive index layer;
*2: HC layer means hard coat layer;
*3: CA means cellulose acetate;
*4: average in-plane refractive index is shown;
*5: DLC means discotic liquid crystal; and RLC mean rod-like liquid crystal.

The present disclosure relates to the subject matter contained in Japanese Patent Application No. 239955/2011, filed on Nov. 1, 2013, and Japanese Patent Application No. 227263/2012 filed on Oct. 12, 2012, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise forts disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A picture display apparatus comprising:
a display panel; and
a polarizing plate on the viewing side surface of the display panel, comprising:
an optical film comprising:
a transparent film having a thickness of 10 to 150 µm and at least a first layer on a first surface of the transparent film,
wherein an average in-plane refractive index of the first layer is the highest one among the average refractive indices of the first layer, the transparent film, and of any layer other than the first layer disposed on the first surface of the transparent film, and the average in-plane refractive index of the first layer is higher than average refractive indices of the transparent film and the layer other than the first layer disposed on the first surface of the transparent film by 0.02 or more,
wherein the average in-plane refractive index of the first layer is higher than the average refractive index of the transparent film by 0.02 or more, provided that the layer disposed on the first surface is the first layer alone, and
wherein the first layer has an optical thickness D satisfying:

$260 \times N - 190 - 65$ nm $\leq D \leq 260 \times N - 190 + 65$ nm ($N$ is an integer of 6 to 12); and further comprising:
a functional layer comprising a hardcoat layer on a second surface of the transparent film; and
a polarizing film,
wherein the polarizing film, the first layer, the transparent film, and the hardcoat layer are positioned in this order, and
wherein the hardcoat layer side is the viewing side in the polarizing plate.

2. The picture display apparatus according to claim 1, wherein the first layer of the optical film is a phase difference layer having an in-plane slow axis that crosses an absorption axis of the polarizing film at an angle of 45°.

3. A 3D picture display system comprising:
a picture display apparatus according to claim 1; and
a polarizing film that transmits a picture displayed on the picture display apparatus to allow viewing the picture as a 3D picture.

4. A 3D picture display apparatus comprising:
a display panel; and
a polarizing plate on the viewing side surface of the display panel,
wherein the polarizing plate comprises an optical film and a polarizing film,
wherein the optical film comprises:
a transparent film having a thickness of 10 to 150 µm; and
at least a first layer on a first surface of the transparent film,
wherein an average in-plane refractive index of the first layer is the highest one among the average refractive indices of the first layer, the transparent film, and of any layer other than the first layer disposed on the first surface of the transparent film, and the average in-plane refractive index of the first layer is higher than average refractive indices of the transparent film and the layer other than the first layer disposed on the first surface of the transparent film by 0.02 or more, wherein the average in-plane refractive index of the first layer is higher than the average refractive index of the transparent film by 0.02 or more, provided that the layer disposed on the first surface is the first layer alone, and wherein the first layer has an optical thickness D satisfying:

260×$N$−190−65 nm≤$D$≤260×$N$−190+65 nm ($N$ is an integer of 6 to 12).

wherein the optical film further comprises:

a hard coat layer on a second surface of the transparent film, wherein the in-plane retardation Re(550) at a wavelength of 550 nm of the optical film is 80 to 200 nm, and the retardation Rth(550) in the thickness direction at a wavelength of 550 nm of the optical film is −100 to 200 nm, wherein the first layer of the optical film is a phase difference layer having an in-plane slow axis that crosses an absorption axis of the polarizing film at an angle of 45°, wherein the polarizing film, the first layer, the transparent film, and the hardcoat layer are positioned in this order, and wherein the hardcoat layer side is the viewing side in the polarizing plate.

5. The picture display apparatus according to claim 1, wherein the functional layer is a high average in-plane refractive index higher than the average in-plane refractive index of the transparent film.

6. The picture display apparatus according to claim 1, wherein the functional layer is a low refractive index layer having an average in-plane refractive index lower than the average in-plane refractive index of the transparent film on the second surface of the transparent film.

7. The picture display apparatus according to claim 1, wherein the first layer is a phase difference layer in which the alignment of a liquid crystal compound is fixed.

8. The picture display apparatus according to claim 1, further comprising:

a second layer between the first layer and the transparent film, wherein the transparent film, the second layer, and the first layer have average refractive indices satisfies the following relationship:

transparent film ≤second layer <first layer.

9. The picture display apparatus according to claim 8, wherein the second layer is an alignment film or a pasting layer.

10. The picture display apparatus according to claim 1, wherein an in-plane retardation Re(550) at a wavelength of 550 nm of the optical film is 80 to 200 nm, and a retardation Rth(550) in the thickness direction at a wavelength of 550 nm of the optical film is −100 to 200 nm.

11. The picture display apparatus according to claim 1, wherein the in-plane slow axis of a first phase difference region is different from the in-plane slow axis of a second phase difference region and/or the in-plane retardation of the first phase difference region is different from the in-plane retardation of the second phase difference region.

12. The picture display apparatus according to claim 1, wherein the transparent film is a cellulose acylate film or a cyclic olefin polymer film.

13. The picture display apparatus according to claim 1, which further comprises a low refractive index layer having an average in-plane refractive index lower than the average in-plane refractive index of the transparent film on the second surface of the transparent film, and wherein the first layer is a phase difference layer in which the alignment of a liquid crystal compound is fixed.

14. The picture display apparatus according to claim 1, which further comprises a low refractive index layer having an average in-plane refractive index lower than the average in-plane refractive index of the transparent film on the second surface of the transparent film, and a second layer between the first layer and the transparent film, and wherein the transparent film, the second layer, and the first layer have average refractive indices satisfying the following relationship:

transparent film ≤second layer <first layer.

15. The picture display apparatus according to claim 1, which further comprises a high refractive index layer having an average in-plane refractive index higher than the average in-plane refractive index of the transparent film, and a low refractive index layer having an average in-plane refractive index lower than the average in-plane refractive index of the transparent film on the second surface of the transparent film, and wherein the first layer is a phase difference layer in which the alignment of a liquid crystal compound is fixed.

16. The picture display apparatus according to claim 1, wherein the functional layer is a high refractive index layer having an average in-plane refractive index higher than the average in-plane refractive index of the transparent film and a low refractive index layer having an average in-plane refractive index lower than the average in-plane refractive index of the transparent film.

* * * * *